United States Patent
Beaudry et al.

(10) Patent No.: US 10,556,251 B2
(45) Date of Patent: Feb. 11, 2020

(54) METHOD OF COATING METALLIC SURFACE WITH COATING HAVING IMPROVED SAG RESISTANCE

(71) Applicant: The Sherwin-Williams Company, Cleveland, OH (US)

(72) Inventors: Channing Charles Beaudry, Coon Rapids, MN (US); William C. Nowack, Miramar Beach, FL (US); James A. Prevost, Prior Lake, MN (US); Feng Zhang, Shanghai (CN); Wylie H. Wetzel, Woodbury, MN (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 15/799,085

(22) Filed: Oct. 31, 2017

(65) Prior Publication Data

US 2018/0318874 A1    Nov. 8, 2018

Related U.S. Application Data

(63) Continuation of application No. 15/046,554, filed on Feb. 18, 2016, now Pat. No. 9,815,083, which is a
(Continued)

(51) Int. Cl.
| | | |
|---|---|---|
| *B05D 3/00* | (2006.01) | |
| *B65D 1/22* | (2006.01) | |
| *B65D 25/14* | (2006.01) | |
| *B65D 25/34* | (2006.01) | |
| *F26B 15/16* | (2006.01) | |
| *B65D 23/02* | (2006.01) | |
| *B05D 3/12* | (2006.01) | |
| *B65D 23/08* | (2006.01) | |
| *B05D 7/00* | (2006.01) | |
| *B65D 6/02* | (2006.01) | |
| *F26B 21/00* | (2006.01) | |
| *B65D 88/12* | (2006.01) | |
| *B05D 7/14* | (2006.01) | |
| *C09D 127/08* | (2006.01) | |
| *C09D 5/02* | (2006.01) | |
| *C09D 5/04* | (2006.01) | |
| *B65D 90/02* | (2019.01) | |
| *B05B 12/08* | (2006.01) | |
| *G05D 7/06* | (2006.01) | |
| *B05D 3/04* | (2006.01) | |
| *C09D 7/43* | (2018.01) | |
| *B05D 7/22* | (2006.01) | |
| *B05D 1/02* | (2006.01) | |

(52) U.S. Cl.
CPC .......... *B05D 3/007* (2013.01); *B05B 12/085* (2013.01); *B05D 3/0413* (2013.01); *B05D 3/12* (2013.01); *B05D 7/14* (2013.01); *B05D 7/56* (2013.01); *B65D 1/22* (2013.01); *B65D 7/06* (2013.01); *B65D 23/02* (2013.01); *B65D 23/08* (2013.01); *B65D 25/14* (2013.01); *B65D 25/34* (2013.01); *B65D 88/121* (2013.01); *B65D 90/02* (2013.01); *C09D 5/024* (2013.01); *C09D 5/04* (2013.01); *C09D 7/43* (2018.01); *C09D 127/08* (2013.01); *F26B 15/16* (2013.01); *F26B 21/006* (2013.01); *G05D 7/0688* (2013.01); *B05D 1/02* (2013.01); *B05D 3/0486* (2013.01); *B05D 7/227* (2013.01); *B05D 2401/20* (2013.01); *B05D 2504/00* (2013.01); *B05D 2520/00* (2013.01); *F26B 2210/12* (2013.01); *Y02P 20/149* (2015.11)

(58) Field of Classification Search
CPC ...... B05D 3/007; B05D 7/14; B05D 2401/20; B05D 2504/00; B05D 2520/00; B05D 7/227; B05D 1/02; B05D 3/0486; B05D 3/12; B05D 7/56; B05D 3/0413; B05B 12/085; G05D 7/0688; B65D 88/121; B65D 23/08; B65D 1/22; B65D 25/14; B65D 25/34; B65D 23/02; B65D 7/06; B65D 90/02; C09D 127/08; C09D 7/43; C09D 5/04; C09D 5/024; F26B 2210/12; F26B 21/006; F26B 15/16; Y02P 20/149
USPC ............................................. 106/468, DIG. 4
See application file for complete search history.

(56) References Cited

U.S. PATENT DOCUMENTS

| | | | |
|---|---|---|---|
| 2,815,880 | A | 12/1957 | Blatz et al. |
| 2,990,294 | A | 6/1961 | Long |
| 3,451,094 | A | 6/1969 | Kywi |
| 3,757,427 | A | 9/1973 | Wilkinson |
| 4,018,966 | A | 4/1977 | Antlfinger et al. |
| 4,079,163 | A | 3/1978 | Tanaka et al. |
| 4,128,519 | A | 12/1978 | Bartoszek et al. |

(Continued)

FOREIGN PATENT DOCUMENTS

| | | |
|---|---|---|
| CH | 629686 | 5/1982 |
| CN | 1042866 | 6/1990 |

(Continued)

OTHER PUBLICATIONS

Jaynes et al., "Hydrophobicity of Siloxane Surfaces in Smectites as Revealed by Aromatic Hydrocarbon Adsorption from Water," Clays and Clay Minerals, vol. 39, No. 4, 428-436, 1991. (Year: 1991).*

(Continued)

*Primary Examiner* — William P Fletcher, III

(57) ABSTRACT

A method for applying a water-based coating and/or coating system to a metallic substrate to form sag resistant coatings is described. The method is particularly effective for protecting metal-containing substrates, such as intermodal cargo containers, against corrosion. The water-based coating includes an aqueous carrier, a resin component in admixture with the aqueous carrier and a high level of one or more CAS agents for excellent sag resistance.

12 Claims, 4 Drawing Sheets

Related U.S. Application Data continuation of application No. 14/329,432, filed on Jul. 11, 2014, now abandoned, which is a continuation-in-part of application No. 13/717,221, filed on Dec. 17, 2012, now abandoned, which is a continuation of application No. PCT/US2011/057010, filed on Oct. 20, 2011.

(60) Provisional application No. 61/450,481, filed on Mar. 8, 2011.

(56) References Cited

U.S. PATENT DOCUMENTS

| | | |
|---|---|---|
| 4,166,536 A | 9/1979 | Roberts et al. |
| 4,179,542 A | 12/1979 | Christofas et al. |
| 4,228,264 A | 10/1980 | Yamamoto et al. |
| 4,257,172 A | 3/1981 | Townsend |
| 4,277,284 A | 7/1981 | Ginsberg et al. |
| 4,328,143 A | 5/1982 | Izumi et al. |
| 4,401,788 A | 8/1983 | Hiyoshi et al. |
| 4,415,698 A | 11/1983 | Fan |
| 4,425,465 A | 1/1984 | Padget et al. |
| 4,435,478 A | 3/1984 | Burgess et al. |
| 4,515,836 A | 3/1985 | Cobbs, Jr. et al. |
| 4,719,038 A | 1/1988 | Sobata et al. |
| 4,771,552 A | 9/1988 | Morioka |
| 4,827,959 A | 5/1989 | Muccitelli |
| 4,837,253 A | 6/1989 | Mansell et al. |
| 4,849,297 A | 7/1989 | Mansell et al. |
| 4,859,723 A | 8/1989 | Kyminas et al. |
| 4,874,412 A | 10/1989 | Nowack |
| 4,888,056 A | 12/1989 | van der Kolk et al. |
| 4,945,134 A | 7/1990 | Wallace et al. |
| 5,039,751 A | 8/1991 | Wallace et al. |
| 5,164,433 A | 11/1992 | Ricci et al. |
| 5,218,031 A | 6/1993 | Nayder et al. |
| 5,230,434 A | 7/1993 | Patrick et al. |
| 5,262,464 A | 11/1993 | Koevenig et al. |
| 5,358,562 A * | 10/1994 | Nae .............. C01B 33/44 |
| | | 106/487 |
| 5,397,606 A | 3/1995 | Jeffs |
| 5,424,355 A | 6/1995 | Uemae et al. |
| 5,427,863 A | 6/1995 | Siebert |
| 5,456,023 A | 10/1995 | Farnan |
| 5,476,890 A * | 12/1995 | Heiss .............. C08K 3/0033 |
| | | 524/244 |
| 5,486,414 A | 1/1996 | Roberto et al. |
| 5,573,367 A | 11/1996 | Erickson et al. |
| 5,574,081 A | 11/1996 | Kroon |
| 5,580,371 A | 12/1996 | Falberg |
| 5,624,978 A | 4/1997 | Soltwedel et al. |
| 5,735,943 A | 4/1998 | Cody et al. |
| 6,010,563 A | 1/2000 | Taketani et al. |
| 6,062,850 A | 5/2000 | Ino et al. |
| 6,120,604 A | 9/2000 | Hawkins |
| 6,162,374 A | 12/2000 | Schoen et al. |
| 6,192,604 B1 | 2/2001 | Morrison |
| 6,393,724 B1 | 5/2002 | Apple et al. |
| 6,394,796 B1 | 5/2002 | Smith |
| 6,468,336 B1 | 10/2002 | Fiedler et al. |
| 6,555,613 B1 | 4/2003 | Poth et al. |
| 6,579,575 B2 | 6/2003 | Emch |
| 6,757,521 B1 | 6/2004 | Ying |
| 6,758,887 B2 | 7/2004 | Bhatia |
| 6,762,230 B2 | 7/2004 | Brandenburger et al. |
| 6,808,808 B2 | 10/2004 | Freeman et al. |
| 6,811,665 B2 | 11/2004 | Blum et al. |
| 6,921,432 B2 | 7/2005 | Nungesser et al. |
| 6,977,012 B2 | 12/2005 | Nobutoh et al. |
| 6,977,013 B2 | 12/2005 | Schroeder et al. |
| 7,045,013 B2 | 5/2006 | DeRegge |
| 7,303,797 B1 | 12/2007 | Barsotti et al. |
| 7,349,755 B2 | 3/2008 | Contos et al. |
| 7,905,723 B2 | 3/2011 | Klobucar et al. |
| 8,245,414 B2 | 8/2012 | Watson et al. |
| 8,689,458 B2 | 4/2014 | Nowack |
| 9,255,734 B2 | 2/2016 | Nowack |
| 2002/0114884 A1 | 8/2002 | Friedersdorf et al. |
| 2003/0177978 A1 | 9/2003 | Nobutoh et al. |
| 2003/0204560 A1 | 10/2003 | Chen et al. |
| 2005/0004268 A1 | 1/2005 | Lynch |
| 2006/0135686 A1 | 6/2006 | Killilea et al. |
| 2006/0166004 A1 | 7/2006 | Zheng et al. |
| 2007/0092657 A1 | 4/2007 | Ferguson et al. |
| 2007/0131831 A1 | 6/2007 | Nowack |
| 2007/0259166 A1 | 11/2007 | Killilea et al. |
| 2007/0259188 A1 | 11/2007 | Wu et al. |
| 2007/0282027 A1 | 12/2007 | Fujimoto et al. |
| 2009/0048384 A1 | 2/2009 | Wang et al. |
| 2009/0054583 A1 | 2/2009 | Fringant et al. |
| 2009/0082505 A1 | 3/2009 | Sorensen |
| 2009/0098395 A1 | 4/2009 | Lu |
| 2009/0130317 A1* | 5/2009 | Moore .............. F26B 21/002 |
| | | 427/378 |
| 2009/0176031 A1 | 7/2009 | Armellin et al. |
| 2010/0167070 A1 | 7/2010 | Chouai et al. |
| 2012/0015102 A1 | 1/2012 | Nowack |
| 2012/0263961 A1 | 10/2012 | Beaudry et al. |
| 2012/0272618 A1 | 11/2012 | Illsley et al. |
| 2012/0298657 A1 | 11/2012 | Wessels et al. |
| 2013/0014406 A1 | 1/2013 | Weschke et al. |
| 2013/0105473 A1 | 5/2013 | Beaudry et al. |
| 2013/0167480 A1 | 7/2013 | Illsley et al. |

FOREIGN PATENT DOCUMENTS

| | | | |
|---|---|---|---|
| CN | 1042866 A | * | 6/1990 |
| CN | 1061612 | | 6/1992 |
| CN | 1061612 A | * | 6/1992 |
| CN | 1152891 | | 6/1997 |
| CN | 201138122 | | 10/2008 |
| DE | 3917004 | | 11/1989 |
| EP | 0030080 | | 8/1981 |
| EP | 0264655 | | 4/1988 |
| EP | 0268042 | | 5/1988 |
| EP | 0391343 | | 10/1990 |
| EP | 0445653 | | 9/1991 |
| EP | 1148084 | | 10/2001 |
| EP | 1151854 | | 11/2001 |
| EP | 1191075 | | 3/2002 |
| EP | 1239061 | | 9/2002 |
| GB | 801700 | | 9/1958 |
| JP | 55097497 | | 7/1980 |
| JP | 62066033 | | 3/1987 |
| JP | 9328672 | | 12/1997 |
| JP | 2003236437 | | 8/2003 |
| JP | 2005083714 | | 3/2005 |
| JP | 2006305409 | | 11/2006 |
| JP | 2008287901 | | 11/2008 |
| JP | 2010070603 | | 4/2010 |
| JP | 2010131897 | | 6/2010 |
| JP | 2011168657 | | 9/2011 |
| KR | 100880524 | | 3/2007 |
| WO | 9615415 | | 5/1996 |
| WO | 9858028 | | 12/1998 |
| WO | 03022940 | | 3/2003 |
| WO | 2006134679 | | 12/2006 |
| WO | 2008130943 | | 10/2008 |
| WO | 2009057104 | | 5/2009 |
| WO | 2009141559 | | 11/2009 |

OTHER PUBLICATIONS

Zhou, Joe, Rheology Additives in Waterborne Basecoats, PCI Mag.com (Oct. 2011) pp. 48-50.

Carraher, Charles E and Raymond B. Seymour. Seymour/Carraher's Polymer Chemistry, New York; M. Dekker, 2003 pp. 553-554.

Ahmad, Zaki, Principles of Corrosion Engineering and Corrosion Control, Boston, MA, Elsevier/BH, 2006, p. 523.

PCT Third Party Observation, Application No. PCT/US2011/057010.

(56) References Cited

OTHER PUBLICATIONS

Halox 550 WF, Low VOC Vinyl Acrylic Dip Primer Formulation (Feb. 11, 2009).
The Definition of "polyvinylidene chloride", Dictionary of Chemistry and Chemical Technology, Chemical Industrial Press, p. 1267, published Jan. 31, 2003.
Burgess, A.J., Caldwell, D. and Padget, J.C., A New Approach to the Design of Latex Paints for the Protection of Steel, J. Oil Col. Chem. Assoc. 1981, 64, 175-185, ICI Mond Division, Runcorn Heath, Ceshire WA7 4QF, England.
"Dipping a Toe in the Water—Again", published Mar. 2011, WorldCargo New, Container Industry, pp. 34-36.
Office Action dated Sep. 24, 2013, US. Patent & Trademark Office, U.S. Appl. No. 13/716,695.
International Search Report and Preliminary Report on Patentability for Related Application PCT/US2011/057010 dated Jun. 29, 2012 and Sep. 10, 2013, respectively. (10 pages).
International Search Report, Written Opinion for related International Application No. PCT/US2011/057040 dated Jun. 29, 2012.
Supplemental EPO Search report and Opinion for European Application 11845062, dated Apr. 11, 2014.
American Colloid Company, Hectabrite DP, Technical Data, revision date May 25, 2001. (1 page).
Office Action dated Apr. 12, 2013, US. Patent & Trademark Office, U.S. Appl. No. 13/716,695.
Procopio, Waterborne Acrylics for Maintenance and Protective Coatings: Moving Beyond Light Duty, Journal of Protective Coatings and Linings, Jul. 2013, Society for Protective Coatings, pp. 18-37.
International Preliminary Report on Patentability for PCT/US2004/006683, dated Feb. 3, 2005. (6 pages).
International Search report for related International Application No. PCT US2011/044185 dated Mar. 26, 2012. (8 pages).
United Stated Environmental Protection Agency, Design for the Environment: Using waterborne basecoats in collision repair shops: a case study, May 2008, available online http://nepis.epa.gov/Exe/ZyNET.exe/P1000PPO.TXT?ZyActionD=ZyDocument&Client=EPA&Index=2006+Thru+2010&Docs=&Query=&Time=&EndTime=&SearchMethod=1&TocRestrict=n&Toc=&TocEntry=&QFie.
Hexion, EPON™ Resin 1031, Technical Data Sheet, Momentive Specialty Chemicals Inc., May 12, 2016, pp. 1-2.
Dai, Viscosity Conversion Table, Dianal America, Inc., retrieved May 2, 2016, p. 1, http://j.b5z.net/i/u/2119873/i/data/viscosity.pdf.
Hexion EPI-REZ Resin 3510-W-60, Technical Data Sheet, Sep. 2005, pp. 1-5.
Technical Specification for Steel Dry Cargo Container 20 x 8 x 9'6" High Cube, Steinecker Containerhandel, Jan 2010, 15 pages.
Hapag-Lloyd, "Container Specification," available online since Dec. 26, 2010, http://web.archive.org/web/20100601000000*/http://www.hapag-lloyd.com/downloads/press-and-media/publications/Brochure_Container_Specification_en.pdf (8 pages).

* cited by examiner

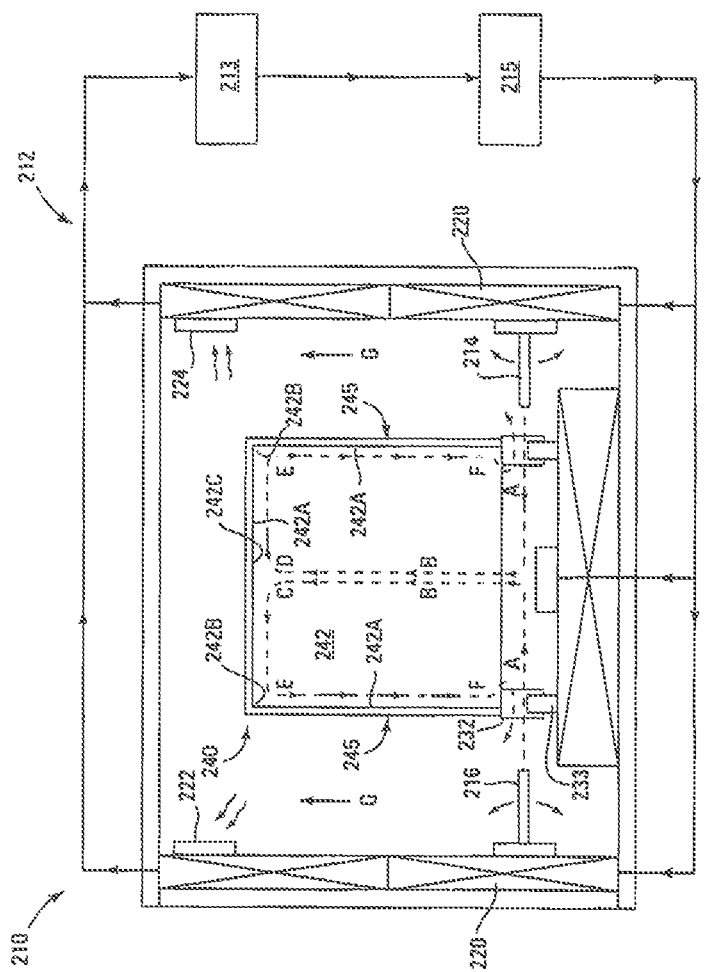

METHOD OF COATING METALLIC SURFACE WITH COATING HAVING IMPROVED SAG RESISTANCE

CROSS-REFERENCE TO RELATED APPLICATION(S)

This application is a continuation of U.S. application Ser. No. 15/046,554 filed 18 Feb. 2016, now granted on 14 Nov. 2017 as U.S. Pat. No. 9,815,083, which is a continuation of U.S. application Ser. No. 14/329,432 filed 11 Jul. 2014 and now abandoned, which is a continuation-in-part of U.S. application Ser. No. 13/717,221 filed 17 Dec. 2012 and now abandoned, which is a continuation of PCT Application No. PCT/US2011/057010, filed 20 Oct. 2011, which claims priority to U.S. Provisional Application Ser. No. 61/450,481, filed 8 Mar. 2011, each of which is incorporated by reference herein in its entirety.

FIELD OF THE INVENTION

The present invention relates to water-based coating systems and methods used to form protective coatings on substrates and in particular metal containing substrates. More particularly, the present invention relates to coating compositions, methods, and coating systems involving an aqueous coating composition. These coatings are typically used as a primer coat (also referred to as a base coat) or as a direct-to-metal coat ("DTM"), wherein the aqueous coating composition preferably has a sufficiently high loading of one or more clay anti-sag agents (hereinafter "CAS agents"), and/or the coating is applied in a controlled humidity environment, to promote enhanced performance of the resultant coatings with respect to sag resistance.

BACKGROUND OF THE INVENTION

Intermodal cargo containers (also referred to as freight or shipping containers) are, reusable transport and storage units for moving products and raw materials between locations, including between countries. Intermodal cargo containers are standardized to facilitate intermodal transport such as among marine transport, freight train transport, and freight truck transport. Standardization of cargo containers also is referred to as containerization.

Containerization has provided global commerce with many benefits. Shipped goods move more easily and cheaply. Manufacturers know that goods loaded at one location can be readily unloaded at the destination. Cargo security has been improved, as containers are usually sealed and can be locked to discourage tampering and theft. Containers also have a longer service life, and there is a stronger market for used containers. Additionally, the costs of cargo containers themselves is lowered because a manufacturer can make these in larger volume knowing that potential customers are available all over the world.

Several international standards have been created to promote international containerization. For instance, the International Organization for Standardization (ISO) has promulgated applicable standards including R-668 to define terminology, dimensions, and ratings; R-790 to define identification markings; R-1161 to recommend corner fittings; and R-1897 to set forth dimensions for general purpose containers. Other standards include ASTM D5728-00, ISO 9897 (1997); ISO 14829 (2002); ISO 17363 (2007); ISO/PAS 17712 (2006); ISO 18185 (2007); and ISO/TS 10891 (2009). An international specification for coating/paint performance is provided by IICL: (Institute of international Container Lessors). See also International Organization for Standardization (ISO), Freight Containers, Vol. 34 of ISO Standards Handbook, 4$^{th}$ Ed., 2006, ISBN 92-67-10426-8; and Levinson, Marc, The Box: How the Shipping Container Made the World Smaller and the World Economy Bigger, Princeton, Princeton University Press, 2006, ISBN 0691123241. Each of these standards and publications is incorporated herein in its entirety for all purposes.

Cargo containers experience harsh, corrosive environments during their service life. When shipped by sea, the containers are exposed to the corrosive effects of salt water. When exposed to nature, the containers must withstand wind, sun, hail, rain, sand, heat, and the like. Containers exposed to the sun can bake to temperatures of 82° C. (180° F.) or even higher.

Accordingly, cargo containers must be made in a way that allows the containers to survive this exposure for a reasonable service life. As one strategy, containers can be made from corrosion resistant materials such as stainless steel, weather steel (also known as weathering steel, COR-TEN brand steel, or CORTEN brand steel). Even when made from such corrosion resistant materials, it still generally is desirable to further apply durable, abrasion resistant, corrosion resistant coatings on the containers as further protection against degradation. Coatings also may be used for decorative, informative, or brand identity reasons.

A typical coating strategy involves applying a top coating over a primer coating. Often, the coatings are applied to one or more vertical surfaces. Historically, mostly solvent-based coating systems have been used to protect cargo containers as many proposed water-based systems have been unable to satisfy the applicable performance demands and/or standards. In particular, waterborne coatings are difficult to apply in widely varying humidity conditions, as an applied film of the coating stays wet for a longer period of time and/or does not dry uniformly, resulting in increased sag of the coating if the viscosity does not recover within the drying period. Consequently, only solvent-based coating systems have found widespread commercial acceptance in the industry. The container industry retains a strong bias against using water-based coating systems.

With increased environmental awareness, there is a strong desire to develop improved technology that would allow use of water-based coating systems to protect cargo containers or other substrates (e.g., vehicles such as rail cars or trucks).

SUMMARY OF THE INVENTION

The systems and method described in this application may be used to dry a wide variety of shipping containers. For example, in one embodiment the containers may be open-topped containers suitable for overseas transport of goods. These containers are typically transported overseas on a container ship to a port, where they are unloaded from the ship and optionally transported by train and/or truck to their final destination. Such shipping containers are typically about 20 feet long, about 7.5 feet wide, and about 7.5 feet high, with an internal volume of about 1136 ft3, or about 40 feet long, about 7.5 ft wide, and about 7.5 feet high, with an internal volume of 2350 ft.

If dried under identical drying conditions, the water in water-based paints does not evaporate as quickly as the solvents in solvent-based paints. If a conventional drying chamber is used to dry shipping containers to which a water-based paint has been applied, the paint on the container does not adequately dry in a reasonable amount of time, which increases operating costs and adversely affects the appearance of the painted container. It is typically not cost-effective to extend the length of the drying chamber or significantly increase the air flow capacity of the system that applies the heated air to the drying chamber.

The present disclosure is directed to a low-cost system and method for drying five-sided containers to which at least one coat of a water-based paint has been applied. The system, which includes a drying chamber and conventional blowers and heaters, may be installed in a shipping facility at low cost, or may be easily retrofitted to existing drying chambers.

In one aspect, the present disclosure is directed to a method of painting, a five-sided container, wherein the container includes an open side, a first wall opposite the open side, and four side walls connected to the first wall, wherein the side walls extend in a first direction with respect to the first wall, and wherein each of the first wall and the four side walls have an interior surface and an exterior surface. The method includes applying a water-based paint to the interior surfaces and the exterior surfaces of the first wall and the side walls of the container; and forcing heated air into the open side of the container to at least partially dry the paint on the interior surfaces and the exterior surfaces of the container. The heated air is directed such that the heated air travels in a second direction opposite to the first direction to contact an interior surface of the first wall and flows in a third direction and a fourth direction thereover, wherein the third direction and the fourth direction are substantially opposite one another and substantially normal to the second direction and the first direction. The heated air flows in the first direction along the interior surfaces of the walls of the container; and exits the container.

In another aspect, the present disclosure is directed to a drying system, including a transport apparatus, wherein the transport apparatus is moveable with respect to a floor. A five-sided shipping container is on the transport apparatus, wherein the shipping container includes an open side, a first wall opposite the open side, and four substantially side walls connected to the first wall, wherein each side wall extends in a first direction from the first wall, and wherein each of the bottom wall and the four side walls have an interior surface and an exterior surface; and a source of heated forced air. The system includes at least one air outlet to direct the heated forced air into the open side of the container and at least partially dry the paint on the interior and exterior surfaces of thereof. The air outlet directs the heated air to flow into the open side of the container to contact the interior surface of the bottom wall of the container; flow over the interior surface of the first wall of the container; flow over the side walls of the container; and exit the open side of the container.

In yet another aspect, the present disclosure is directed to a drying system, including a transport apparatus, wherein the transport apparatus is moveable with respect to a floor, and a five-sided shipping container on the transport apparatus. The shipping container includes an open side facing downward toward the floor, a first wall opposite the open side, and four substantially planar side walls connected to the bottom wall, wherein each side wall extends from the first wall and downwardly toward the floor, and wherein each of the bottom wall and the four side walls have an interior surface and an exterior surface. An oven encloses the transport apparatus and the shipping container; and a source deliver heated forced air to the oven. The floor includes an air outlet to direct the heated forced air upwardly and away from the floor to enter the open side of the container and at least partially dry the paint on the interior and exterior surfaces of thereof. The heated air is directed by the outlet to contact the interior surface of the first wall of the container, move over the interior surface of the first wall of the container, move downward toward the floor along the interior surface of the side walls of the container, and exit the open side of the container.

In one embodiment, the present invention provides a water-based coating composition and/or system that can be used to form a coating that is preferably sag resistant as the composition dries in a variety of humidity environments (e.g., the coating is preferably sag resistant in normal and/or humid drying environments). The coating system is particularly effective for protecting metal-containing substrates, such as intermodal cargo containers, against corrosion.

As an overview, the present invention provides water-based compositions suitable to form primer coats (or DTM coats) on substrates as well as top coat compositions suitable to form top coats directly or indirectly on underlying coatings. Desirably, the water-based composition incorporates one or more CAS agents in an amount sufficient to prevent the coating from sagging to an undue degree as the composition dries in a variety of humidity environments (i.e. in a humid environment, and/or in a relatively dry environment).

This finding has solved a challenging problem that has frustrated the introduction of water-based coatings for use in the shipping container market. Namely, it has been very difficult to formulate water-based coating systems that show acceptable sag resistance while drying on an underlying container surface in a variety of humidity environments. Many conventional water-based systems, especially those that include a chlorinated resin such as PVDC, have failed to pass applicable sag resistance tests in a variety of humidity environments (e.g., in confined areas and/or outside areas that have high humidity due to, e.g., the season, geographical location, combinations of these and the like, and/or in a relatively dry environment). The coatings sag to an undue degree, e.g., as the wet coating film dries while the underlying substrate is positioned in a vertical manner and gravity is acting on the drying film. Thus, there has been a strong need to improve the sag resistance of these coatings and to increase their useful operating range (i.e., being able to dry without sagging in relatively humid environments as well as relatively dry environments). The industry strongly desires a commercially available, water-based coating system that is able to satisfy the stringent demands of the intermodal cargo container industry.

In one embodiment, the present invention provides water-based compositions that can be used to form coatings such as a primer coat with excellent sag resistance. An aqueous coating composition according to the present invention can have an atypically high loading of one or more CAS agents (e.g., 1.5 to 5 times the level of conventional amounts), to help make the coatings more resistant to sagging while the coating dries in a relatively humid environment. Advantageously, the selected CAS agents do not undesirably impact viscosity, and/or dry time of the coating composition and/or do not have their sag resistant functionality compromised to an undue degree. Surprisingly, including elevated levels of one or more CAS agents in preferred aqueous coating compositions according to the present invention does not undesirably impact viscosity, dry time, and/or sag resistant functionality over a wide range of humidity from 45 to 95%) and/or pH (e.g., from pH of 5-8).

Unfortunately, adjusting the type and amount of many types of sag resistance agents and thickeners can be challenging in the context of a water-based composition because one or more physical and/or theological parameters can be impacted to an undue degree, e.g., dry time and/or viscosity. Also, if the pH of the aqueous composition changes for any reason (e.g., becomes more acidic as the coating dries) the functionality of the sag resistance can be undesirably affected.

As an example, if the viscosity of an aqueous coating composition increases too much, it can become very difficult to apply the composition in a practical manner and/or the dry time can be undesirably increased because the highly viscous liquid tends to inhibit the release of water so as to let the coating dry. Also for example, if the pH decreases too much, such as when a coating releases ammonia during drying, the acidic coating composition can etch the underlying substrate to an undue degree and/or the sag resistant functionality of the selected sag resistant agent or thickener may be comprised to an undue degree by a change in pH. For example, a change in pH as the coating composition dries can occur in the context of aqueous coating compositions that include an acidic chlorinated resin such as polyvinylidene chloride.

Increasing the levels of CAS agents beyond conventional levels for use in a humid drying environment can be counterintuitive for several reasons. For example, conventional wisdom holds that the viscosity will increase when excessive amounts of CAS agents are used to a degree such that the release of water from the composition may be inhibited and the dry time will thereby be undesirably increased. As yet another example, increasing the levels of CAS agents beyond conventional levels (e.g., above one pound of GAS agent per 100 pounds (0.12 kg of CAS agents per 100 L) of aqueous coating composition) is counterintuitive because hydrophilic clay-based materials are hygroscopic and they may further inhibit the release of water from the composition and thereby increase dry time to an undue degree.

Surprisingly, increasing the level of CAS agents beyond conventional levels prevents undue sagging in a humid environment, yet allows water to be released from the coating and does not impact dry time to an undue degree.

In addition to controlling sag resistance using specific agents or thickeners, it is possible to improve sag resistance of the primer composition using other types of thickeners or rheology agents, if the system used, to apply and dry/cure the coating includes measures to control humidity. By controlling the humidity conditions in the spray booth when the coating is applied, and in the oven during drying/cure of the coating, a wet film of the coating is allowed to dry uniformly in a way that eliminates problems associated with sag caused by high humidity environments (i.e. the shear forces acting on a wet film applied to a vertically positioned substrate).

BRIEF DESCRIPTION OF THE FIGURES

FIG. 4 is a schematic, cross-sectional view of another embodiment of a drying chamber used to dry a five-sided container coated with a water-based paint.

Like symbols and reference numerals in the drawings are used to designate like elements.

DETAILED DESCRIPTION

Figure 1:
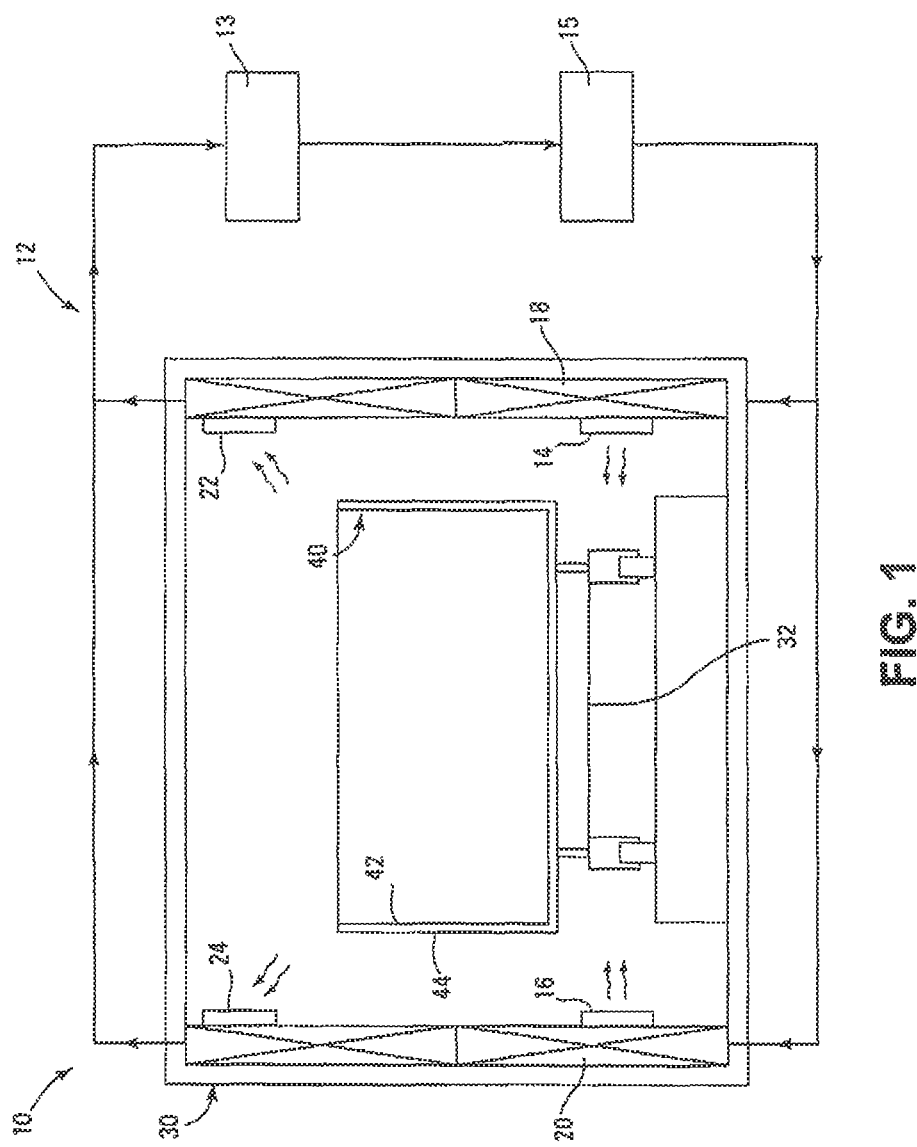
FIG. 1 is a schematic, cross-sectional view of a conventional drying chamber used to dry a five-sided container coated with a solvent-based paint.

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention. All patents, pending patent applications, published patent applications, and technical articles cited herein are incorporated herein by reference in their respective entireties for all purposes.

The aqueous coating compositions of the present invention can be used to form a primer coating on a substrate (or a "DTM" coating). In certain embodiments, the aqueous coating composition can be used as a first aqueous composition in a coating system of the present invention. For simplicity purposes, but without limitation, the aqueous coating composition of the present invention will be described below in the detailed description as a first aqueous composition in the context of a coating system of the present invention.

In an embodiment, a coating system of the present invention generally and preferably includes a first aqueous coating composition that can be used to form a corrosion resistant primer coating on a substrate (or a DTM coating). The system, when the first aqueous coating is used as a primer, desirably and optionally further includes a second aqueous coating composition that can be used to form a durable, abrasion resistant top coating over the first/primer coating. Related coating systems are described in Assignee's co-pending application, U.S. application Ser. No. 13/452,538, filed 20 Apr. 2012, which claims priority to U.S. App. Ser. Nos. 61/450,471, filed 8 Mar. 2011 and 61/394,972, filed 20 Oct. 2011.

In an embodiment, the first aqueous coating composition generally and preferably includes ingredients comprising at least a first resin component in admixture with in an aqueous carrier and one or more CAS agents dispersed in the aqueous coating composition. The first aqueous coating composition of the invention may be a single phase solution in which one or more ingredients including at least the first resin component are substantially fully dissolved in the aqueous carrier. Alternatively, the coating compositions may include two or more phases. Compositions including two or more phases may be in the form of dispersions such as a dispersion in which one or more phases are dispersed in a continuous phase of another material and/or phase. Many dispersions are in the form of suspensions including but not limited to colloidal suspensions. In some embodiments, coating compositions are in the form of a latex or emulsion including polymer microparticles dispersed in an aqueous carrier. As used herein, a "latex" polymer means that a polymer is in admixture with an aqueous carrier with the help of at least one emulsifying agent (e.g., a surfactant) for creating an emulsion of polymer particles in the carrier.

In some embodiments, the compositions described herein may be water-reducible meaning that the composition remains stable if diluted with additional amounts of water. For water-reducible compositions, some embodiments use at least one polymer that is capable of being dispersed in water without requiring the use of a separate surfactant, although separate surfactants could be used if desired. Polymers that can be dispersed in water without requiring a separate surfactant often include pendant ionic functionality and/or hydrophilic chain segments that render corresponding regions of the polymer to be more compatible with water. External acids or bases may be required for anionic stabilization, but such acids and bases usually are different than the emulsifying agents (e.g., surfactants) that are used to disperse a latex polymer.

In an embodiment, the first resin component includes at least one film-forming resin that desirably helps the overlying top coat adhere better to the underlying substrate and/or in combination with the top coat provides additional protection for the substrate. In those embodiments intended to be used on coated or uncoated metal substrates, the resin(s) of the first resin component desirably form(s) a coating that is sufficiently impermeable to water vapor or liquid as well as desirably hydrophobic to help reduce oxidation or other degradation that could be caused by moisture.

The resin(s) useful in the first resin component may be thermosetting and/or thermoplastic. Conveniently, one or more of these are thermoplastic. Further, some embodiments of a thermoplastic resin useful in the practice of the present invention may be amorphous, crystalline or semicrystalline. Illustrative resins used in the first resin component include acyclic, cyclic, branched, linear, aliphatic, or aromatic resins. Thermoplastic resins desirably have a minimum film forming temperature (MFFT) that is below about 65° C., preferably below about 45° C., more preferably below about 25° C. It is also desirable that such resins desirably have a minimum film forming temperature that is greater than about −50° C., preferably greater than −25° C., more preferably greater than about 0° C.

The molecular weight(s) of the one or more resins of the first resin component independently may vary over a wide range. If the molecular weight is too low, then the coating may not be durable enough or may not be resistant to solvent attack. If too high, then the coating may not be easy to apply at sufficient solids level. Balancing such concerns, the number average molecular weight desirably is in the range from about 5,000 to 75,000, more preferably about 10,000 to 50,000, more preferably from about 10,000 to 20,000; and the weight average molecular weight is in the range from about 10,000 to 150,000, more preferably about 20,000 to 80,000, more preferably about 35,000 to 55,000. As used herein, molecular weight refers to the number average molecular weight ($M_n$) unless otherwise expressly noted.

Preferably, the first resin component includes at least one chlorinated resin derived from one or more reactants, wherein at least one of the reactant(s) is at least partially chlorinated. Chlorinated resins help to provide coatings with excellent corrosion resistance, particularly in marine environments in which substrates protected by the coating system are exposed to solvents, fresh water, salt water, and the like. The Cl substituents of the chlorinated reactants) may be attached directly to the reactant backbone by a single bond or via a suitable linking group. In some embodiments, chlorinated reactants may be monomeric, oligomeric, and/or polymeric. In some embodiments, free radically polymerizable functionality may be present.

In addition to one or more chlorinated reactants, one or more additional copolymerizable monomers, oligomers, and/or resins may also be used with the chlorinated resins, if desired. The chlorinated reactant(s) desirably constitute at least 50 weight percent, more preferably at least 70 weight percent, even niece preferably at least 85 weight percent, and even up to 100 weight percent of the resultant chlorinated resin(s).

The Cl content of the resultant chlorinated resin can vary over a wide range. Thus, resin embodiments can be partially chlorinated or perchlorinated. If the Cl content is too low, the corrosion protection provided by the resin may be less than is desired. The Cl content can be characterized as the weight percent of Cl included in the chlorinated resin. For higher levels of corrosion protection, it is desirable that a chlorinated resin includes at least about 20 weight percent Cl, preferably at least about 40 weight percent Cl, and more preferably at least about 60 weight percent Cl. Perchlorinated embodiments represent a practical upper limit upon Cl content.

Chlorinated resins of the type described herein may be made by radical polymerization of chlorinated monomers. Chlorinated monomers preferably include, for example, reactants with free radically polymerizable functionality (e.g., carbon-carbon double bonds), and have structures including 2 to 20, preferably 2 to 10, more preferably 2 to 4 carbon atoms and at least one carbon-carbon double bond. More preferred are chlorinated ethenes, chlorinated propenes, and combinations of these, such as monochloroethene, 1,1-dicholoro ethane, 1,2-dichloroethene. 1,1,2-trichloroethene, tetrachioroethene, 1-chloropropene, 2-chloropropene, 1,1-dichloropropene, 2,2-dichloropropene, 1,2-dichloropropene, 1,1,1-trichloro-2-propene, 1,1,2-1-propene, 1,2,3-trichloropropene, combinations of these, and the like.

Chlorinated resins of the type described herein also may be by radical polymerization of chlorinated monomers with monomers or comonomers of ethylenically unsaturated esters, amides, and anhydrides of carboxylic acid. Suitable ethylenically unsaturated comonomers include, for example, (meth)acrylic acid and derivatives such as glycidyl (meth)acrylate. (meth)acrylic acid, methylaminoethyl (meth)acrylate, (meth)acrylic, t-butylaminoethyl (meth)acrylate, (meth)acrylamide, 4-pentanoguanamine, hydroxylalkyl esters such as hydroxypropyl (meth)acrylate, hydroxyethyl (meth)acrylate, (meth)acrylonitrile, N-alkoxyalkyl amides such as methoxymethyl (meth)acrylamide and butoxy-(methyl) acrylamide, and hydroxyalkyl amides such as N-methylol (meth)acrylamide, dicarboxylic acids such as maleic acid, corresponding anhydrides of these (if any), combinations of these, and the like.

Preferred chlorinated resins may be prepared as described in U.S. Pat. Nos. 4,341,679; 4,401,788; 4,435,478; 4,543,386; and 4,783,499.

In addition to the one or more Cl substituents and free radically polymerizable functionality, the chlorinated reactants used to make chlorinated resins may otherwise be substituted or unsubstituted with additional kinds of functionality, including epoxy-functionality, for example. Such functionality optionally may be used for crosslinking. As an additional option, such functionality may be used to provide the resin with integral dispersing functionality. Some substituents may be co-members of a ring structure. Examples of other substituents include hydroxyl, thiol, amino, amide, isocyanate, nitrile, carboxy, sulfate, sulfite, fatty acid, epoxide, and combinations of these groups.

The composition may also contain one or more other types of free-radical addition polymers (e.g. produced by the five-radical addition polymerization or copolymerization in aqueous emulsion of one or more monomers such as vinylidene chloride, alkyl(meth)acrylates having 1 to 12 carbon atoms in the alkyl group, alkoxyalkyl(meth)acrylates having 1 to 12 carbon atoms in the alkyl group, styrene, (meth)acrylonitrile, allyloxy groups, cyanate ester groups, vinyl acetate, vinyl ether groups, vinyl chloride, ethylene, cis- and trans-1,3-butadiene, cis- and trans-isoprene, cis- and trans-chloroprene, 1-deceive, 1-pentene, and 1-octene, combinations of these and the like.

Free radically polymerizable functionality is conveniently reacted by exposing the reactants to a suitable source of curing energy, often in the presence of agents (e.g., initiators, etc.) that help promote the desired reaction. The energy source used for achieving polymerization and/or crosslinking of the curable functionality may be actinic (e.g., radiation having a wavelength in the ultraviolet or visible region of the spectrum), accelerated particles (e.g., electron beam radiation), thermal (e.g., heat or infrared radiation), or the like.

A particularly preferred chlorinated resin is polyvinylidene chloride (PVDC). As used herein, polyvinylidene chloride refers to a resin in which 1,1-dichloroethene constitutes at least 40 weight percent, optionally at least 60 weight percent, further optionally at least about 75 weight percent, further optionally at least about 90 weight percent, and optionally even up to 100 percent by weight of the reactants used to make the resin. A wide range of suitable embodiments of polyvinylidene chloride resins are available from commercial sources. Commercially available embodiments include, without limitation, those available under the trade designations DIOFAN (available from Dow Chemical and/or Solvay Plastics), POLIDENE (e.g., 33-082, 33-038, 33-086, 33-083, 33-075, and 33-081 available from Scott Bader), HALOFLEX (e.g., 202 and 2025 available from DSM Neoresins), PERMAX (e.g., 803 and 805 available from Lubrizol), combinations of these, and the like. In an aspect, PVDC or other commercially available chlorinated resins may be modified with specific functionality, such as epoxy-functionality, for example.

In one preferred mode of the invention, an aqueous PVDC composition is treated to raise its pH to thereby make the composition less acidic (e.g., such that it has a pH in the range of from 3 to 8). Adjusting the pH in such a manner is described in Assignee's co-pending Assignee's co-pending application, U.S. application Ser. No. 13/452,538, filed 20 Apr. 2012, which claims priority to U.S. App. Ser. Nos. 61/450,471, filed 8 Mar. 2011 and 61/394,972, filed 20 Oct. 2011.

The first resin component preferably includes at least about 50 weight percent, more preferably about 50 to 70 weight percent, and most preferably about 75 to 100 weight percent of a chlorinated resin, such as PVDC, for example.

In addition to the chlorinated resin(s), the first aqueous coating composition optionally may include one or more other kinds of resin components. Preferably these are hydrophobic and substantially miscible with chlorinated resins so that any undesirable amounts of phase separation among resins is substantially avoided. Exemplary resins include epoxies, polyurethanes, polyamides, polyimides, halogenated polymers, polysilicones, polyesters, alkyds, polyolefins, (meth)acrylic resins, combinations of these and the like. Acrylic latex emulsions are preferred, including, for example, polyurethane dispersions (PUD), all-acrylic emulsions, styrene-acrylic emulsions, and acrylic-modified alkyd resin dispersions. In an aspect, styrene-acrylic emulsions are preferred. The amount of these may be selected from a wide range, balancing concerns of compatibility against performance of the coating, in terms of corrosion resistance and heat resistance. In a preferred aspect, the first aqueous coating composition includes up to about 50 wt %, preferably about 5 to 50 wt %, preferably about 5 to 50 wt %, more preferably about 15 to 40 wt %, and most preferably about 20 to 30 wt % of acrylic latex emulsion, based on the total weight of resin components in the first aqueous coating composition.

The amount of first resin component in the first aqueous coating composition may be selected from a wide range. Generally, if the amount of resin component is too low, then it may be difficult to form a film, more difficult to form a film that has sufficient adhesion to the substrate, the film may have insufficient corrosion resistance or other performance, and/or the like. If too much is used, then it may be harder to formulate a pigmented system or it may be more difficult to make a material that can be applied to the substrate. Balancing such concerns, the first aqueous coating composition preferably includes from about 10 to about 70 weight percent, more preferably about 15 to about 50 weight percent, and most preferably about 20 to about 40 weight percent of the first resin component based on the total weight of the aqueous coating composition.

The first resin component is in admixture with an aqueous carrier. As used herein, "aqueous" means that at least about 5 weight percent, preferably at least about 20 weight percent, more preferably at least about 40 weight percent, and even more preferably at least about 60 weight percent of the carrier, and even 90 weight percent or more is water, based upon the total weight of the carrier. Most preferably, from about 85 weight percent to about 100 weight percent, more preferably about 95 to about 99 weight percent is water.

In addition to water, the aqueous carrier of the first aqueous coating composition optionally may include one or more additional, optional co-carriers. Co-carrier(s) may be used for a variety of purposes, including helping in film formation and/or paint stability. Examples of suitable co-carriers include butyl cellosolve, alcohol(s), such as butanol, coalescing agents (e.g., ester alcohol(s), such as the Eastman Texanol product and/or to VOC coalescents such as are described in U.S. Pat. Nos. 6,762,230 and 7,812,079), glycol ether(s), combinations of these, and the like. Desirably, so-called VOC-exempt co-carrier(s) are preferred.

The amount of co-carrier included in the first aqueous coating composition can vary over a wide range. The amount(s) to use will depend on factors including the type of co-carrier, the purpose for which the co-carrier is being added, the coating technique(s) that might be used to apply the first aqueous coating composition onto a substrate, and the like. In illustrative embodiments, the first aqueous coating composition may include from about 0.3 weight percent to about 80 weight percent, desirably 0.3 weight percent to about 15 weight percent, more desirably about 1 to about 5 weight percent of co-carrier(s) based on the total weight of co-carrier and water included in the composition.

In addition to the first resin component and the aqueous carrier, the first aqueous coating composition preferably includes a sufficient amount of one or more CAS agents to provide sag resistance. As used herein, a "CAS agent" refers to a clay material or clay-based material that can be included in an aqueous coating composition according to the present invention in an amount sufficient so that the aqueous coating composition resists flow to a desirable degree as it dries after being applied as a film on a vertical substrate (i.e., does not sag to an undue degree). For example, a CAS agent as used herein refers to a material that can help an aqueous coating composition according to the present invention satisfy the Wet Sag Resistant Test described in below in the Examples. A CAS agent can include, as a main component (at least 50 percent by weight), a silicate mineral having a layer-like crystal structure. Examples thereof include smectite, bentonite, montmorillonite, saponite, hectorite, and the like.

One preferred clay material includes bentonite. These clay minerals may be used alone or in a mixture of two or more kinds thereof and are typically hydrophilic and hygroscopic.

Applicants discovered that an unconventionally high level of CAS agents can prevent the aqueous coating composition from sagging while drying in a relatively humid environment, yet not impact viscosity and/or not impact thy time and/or not be affected by coating composition pH to an undue degree. Increasing the level of CAS agents beyond conventional levels is counterintuitive because CAS agents are known to increase viscosity and can be hygroscopic. Moreover, the effectiveness of CAS agents in the humid environments is highlighted by the observation that increasing the levels of non-clay-based thickeners (e.g., associative thickeners) did not improve sag resistance across a humidity range. It is noted that including one or more CAS agents in the first aqueous coating composition according to the present invention can provide suitable sag resistance in humid environments as well as relatively dry environments.

One or more CAS agents can be present in an amount that can prevent a coating of the aqueous composition on a vertical substrate from sagging while drying in a variety of humidity environments and conditions. In certain embodiments, the drying environment has a humidity in the range of from 50 to 99 percent relative humidity, more typically in the range of from 50 to 90 percent relative humidity. As used herein, "relative humidity" can be expressed as the ratio of the vapor partial pressure of the air to the saturation vapor partial pressure of the air at the actual dry bulb temperature. Relative humidity by partial pressure is expressed as follows:

$$\varphi = (p_w/p_{ws})*100\%$$

where $\varphi$=relative humidity (%)

$p_w$=vapor partial pressure $p_{ws}$=saturation vapor partial pressure at the actual dry bulb temperature.

CAS agents useful in the present invention may be naturally occurring or synthetic, and may or may not be modified such as modified clay. As used herein, "modified clay" relates to clays whose surface chemistries have been altered. Modified clay minerals are well known, examples of which are disclosed in U.S. Pat. No. 7,109,257 (Lorah et al.) and U.S. Pub. No. 2009/0098169 (Ootake et al.). A preferred modified clay includes organically modified clay. An organically modified clay can also be referred to as an "organoclay." As used herein, an "organically modified clay" or an "organoclay" refers to a cation-modified clay derived from a clay mineral, generally of the smectite group, for example, bentonite, montmorillonite, hectorite, saponite or the like, by replacing the inorganic exchangeable cations, generally alkali or alkaline earth metal cations, which occur in the natural clay mineral, by organic cations each comprising at least one hydrocarbon radical which has sufficient carbon atoms (e.g., quaternary alkylammonium ions). Organoclays with a wide range of surface wetting characteristics (e.g., hydrophobic or hydrophilic) have been described in the literature. Hydrophilic organoclays are commonly prepared by onium ion exchange using, e.g., polyether substituted quaternary ammonium compounds. These organoclays are dispersible in water-based systems and can be used for rheology control in products such as latex paints. A preferred organoclay includes bentonite that has been modified with quaternary amines. Organically modified clays are well known, an example of which is described in U.S. Pat. No. 4,743,305 (Doidge et al.).

A variety of CAS agents for use in the present invention are commercially available. For example, a suitable CAS Agent for use in the present invention is commercially available under the tradename BENTONE® LT from Elementis Specialties, Inc., Hightstown, N.J. BENTONE® LT is a hydrophilic organoclay material product and is a combination of hydroxyethyl cellulose and bentonite clay.

In certain embodiments, it has been found that associative thickeners do not work well in helping prevent sag of first aqueous coating compositions of the present invention in humid environments (e.g., they can increase dry time to an undue degree). As used herein an "associative thickener" refers to any hydrophobically modified water-soluble polymer capable of interacting in aqueous solution with itself and with another species. The inclusion of hydrophobic modification enhances the ability of a water-soluble polymer to thicken water or to interact with other hydrophobic species and surfaces. These other hydrophobic species include, but are not limited to, the hydrophobe of a surfactant, the surface of a latex particle, the hydrophobic surface of pigments, or any other component of a waterborne coating composition. Examples of associative thickeners include nonionic urethanes, polyether urea polyurethane, acrylate polymers, cellulose ethers, polyethyleneglycol, and combinations of these. In an aspect, the first aqueous coating composition described herein is substantially free of associative thickeners, where "substantially free" refers to an amount less than about 5 wt % of the total weight of the first aqueous coating composition.

As mentioned, even though CAS agents (e.g., hydrophilic clay and/or modified clay) are preferably present in unconventionally high levels, the time that it takes the first aqueous coating composition to substantially dry is not unduly impacted. Drying time is known in the art to be the time it takes the composition to dry "to the touch." In certain embodiments, a first aqueous coating composition according to the present invention can dry in a time period in the range of from 10 to 45 minutes at a relative humidity of from 50 to 90 percent at 25° C., preferably from 15 to 30 minutes at a relative humidity of front 50 to 90 percent at 25° C.

To help provide suitable sag resistance in a humid environment according to the present invention, the one or more CAS agents are present in an amount of greater than 1 pound (0.12 kg), greater than 1.25 pounds (0.15 kg), greater than 1.5 pounds (0.18 kg), greater than 2.0 pounds (0.24 kg), greater than 2.5 pounds (0.30 kg), greater than 3.0 pounds (0.36 kg), or even greater than 4.0 pounds (0.48 kg), per 100 gallons (per 100 L) of the aqueous coating composition. Typical ranges include from 1.5 pounds to 15 pounds (0.18 to 1.8 kg), from 2.0 to 5.0 pounds (0.24 to 0.60 kg), or even 2.5 to 4.0 (0.30 to 0.48 kg) pounds per 100 gallons (per 100 L) of the aqueous coating composition.

To help provide suitable sag resistance in a humid environment according to the present invention, the one or more CAS agents have a particle size less than two micrometers, preferably in the range of 0.05 to 2 micrometers. Particle size refers to the diameter of a particle of clay (the diameter of an irregular volume is the longest distance between two points on its surface).

"Sag resistance" of the first aqueous coating composition according to the present invention refers to flow resistance of the first aqueous coating composition. In the description herein, sag resistance is measured according to the Sag Resistance Test described below, although conventionally measured by reference to ASTM Method D 4400. In certain embodiments, a first aqueous coating composition according to the present invention has a sag resistance value measured according to the Sag Resistance Test in an environment having a humidity greater than 65 percent relative humidity of at least 6 mils (0.015 cm), preferably at least 8 mils (0.02 cm), preferably at least 10 mils (0.025 cm), and most preferably at least 12 mils (0.03 cm). It is desirable for a first aqueous coating composition according to the present invention to have a sag resistance value measured according to the Sag Resistance Test in an environment having a humidity greater than 50 percent relative humidity in the range of from 8 mils (0.02 cm) to 6 mils (0.04 cm).

As mentioned, even though the CAS agent(s) are present in unconventionally high levels, the viscosity of the first aqueous coating composition is not impacted to an undue degree (e.g., during storage). Surprisingly, using CAS agent(s) can allow the aqueous coating composition to have a stable viscosity. As an example of stable viscosity, the viscosity does not change more than +/−20% (preferably +/−10%, +/−5%, or even +/−2%) when stored at temperatures ranging from about 25° C. to about 49° C. "Stormer viscosity" refers to a viscosity measurement in Krebs units on a Stormer viscometer. Stormer viscosities are measured according to ASTM Method D 562. In certain embodiments, a first aqueous coating composition according to the present invention has a viscosity in the range of from 50 to 90 Krebs units at 25° C., preferably from 60 to 70 Krebs units at 25° C.

Also as mentioned, the pH of the first aqueous coating composition preferably does not affect the functionality of the CAS agent(s) to an undue degree. The "pH" of the aqueous coating composition is the negative logarithm of the hydrogen ion concentration. In certain embodiments, a first aqueous coating composition according to the present invention has a pH in the range of from 4 to 9, more preferably from 4.5 to 7.5, and most preferably from 5 to 7 during at least a portion of the time that the coating composition is drying.

Advantageously, including CAS agents at unconventionally high levels in the first aqueous coating composition does not impact shelf-life stability to an undue degree. As used herein, "shelf-life stability" means that the aqueous coating composition has a viscosity and/or sag resistance that does not substantially change over a time period typical of a storage time period and temperature. In exemplary embodiments, a first aqueous coating composition according to the present invention has a shelf-life stability of at least four months, preferably at least six months. Shelf-life stability can be measured by placing a closed container of the aqueous coating composition in a "hot-box" at 120° F. (419° C.) for 14 days. Preferably, the viscosity and/or sag resistance do not change more than 20% after 14 days at 49° C., preferably no more than 10%, 5%, or even 2% after 14 days at 49° C.

In addition to the first resin component, the aqueous carrier, and the one or more CAS agents, one or more additional ingredients optionally may be included in the first aqueous coating composition. When choosing additional ingredients, it is desirable to make selections that minimize a risk of degrading the chlorinated resin(s). For example, it has been common in some conventional PVDC-based coating compositions to include Zn containing ingredients. Examples of these include zinc, zinc salts, and/or zinc oxide, Such Zn-containing ingredients can provide many benefits. These benefits include corrosion resistance, protection against flash rusting, or the like.

Such compositions can, however, contribute to degradation of chlorinated resins, particularly at elevated temperatures above about 140° F. (60° C.). Without wishing to be bound, it is believed that this degradation may occur because certain metals and metal-containing species such as, for example, zinc, iron, tin and the like, are capable of catalyzing dehydrochlorination of the chlorinated resin when the resin is exposed to high temperatures. The degradation can reduce the quality of the resultant coating and may be a contributor toward problems such as blistering, peeling, cracking, and the like. Other transition metals such as iron, tin, and the like also may have similar catalytic activity and may cause similar degradation issues.

In some embodiments in which catalytically active metals or metal-containing species (e.g., Zn or Zn-containing species) or the like may be present in the first aqueous coating composition, using mixed metals can reduce the catalytic activity and help to stabilize the compositions. For example, mixed metal stabilization may occur in systems including combinations of barium/zinc, calcium/zinc, barium/calcium/zinc, and the like. In an aspect, when stabilized by a mixed metal system, the first aqueous coating composition preferably contains about 25 wt % Zn, more preferably about 10 to 20 wt % Zn, and most preferably about 5 to 15 wt % Zn.

In some embodiments, certain forms of catalytic metals or catalytic metal-containing species may be passivated or encapsulated such that catalytic dechlorination of the resin by the metal is prevented or significantly reduced. Such species can be included in the first aqueous composition without causing significant dechlorination. Suitable species include without limitation, certain Zn salts, including soluble such as $Zn(NO_3)_2$, $ZnSO_4$ and the like, for example. In an aspect, when present in the first aqueous coating composition, the Zn-containing species is present at preferably about 2 wt % to about 15 wt %, more preferably at about 2 wt % to about 10 wt %, and most preferably at about 2 wt % to about 5 wt %.

Even with the potential for stabilization, it is desirable in some embodiments to limit or even at least substantially exclude ingredients from the first aqueous coating composition that might include metals such as zinc that could be catalytically active with respect to degradation of chlorinated resins. Excluding such catalytically active metals is particularly desirable if the resultant coating is expected to be exposed to higher temperatures in the course of its service life, as the metals tend to be more active at higher temperatures. Indeed, it has been observed that excluding zinc and zinc containing compositions from various sources, including from tillers, flash rust inhibitors, pigments and other additives in the first aqueous coating composition greatly improves heat resistance of PVDC resin material(s) and dramatically reduces tendencies of the resultant coatings to blister, peel, and crack. Accordingly, because some metals such as Zn can promote degradation of chlorinated resins at elevated temperatures, it may be desirable to select ingredients that have a minimal amount, if any, of catalytically active metal contaminants, particularly when heat resistance is desired. In an aspect, where heat resistance is desired, the first aqueous coating composition preferably contains no more than about 10 wt % Zn, more preferably no more than about 7 wt % Zn, and most preferably no more than about 5 wt % Zn.

With these selection principles in mind, one or more additional ingredients may be incorporated into the first aqueous coating composition. For example, the ingredients used to formulate a coating composition of the present invention optionally may include one or more HCl scavengers. HCl scavenger(s) beneficially scavenge free HCl to help inhibit further degradation of the PVDC resin. Preferred HCl scavengers include epoxy functional molecules, flash rust inhibitors, dienophiles, antioxidants, metal chelating compounds, isocyanate compounds, organosulfur compounds and the like, and are further described in Assignee's co-pending Assignee's co-pending application, U.S. application Ser. No. 13/452,538, filed 20 Apr. 2012, which claims priority to U.S. application Ser. Nos. 61/450,471, filed 8 Mar. 2011 and 61/394,972, filed 20 Oct. 2011.

It also may be desirable to incorporate one or more anticorrosive agents into the composition to help further protect the underlying substrate and the resultant coatings) against corrosion. Some of these are based upon heavy metals such as Pb or Cr. Other suitable environmentally friendly materials include barium, calcium, phosphosilicate, calcium titanate, calcium silicate (e.g., calcium ion-exchanged amorphous silica), condensed calcium phosphate, aluminum triphosphate and the like. Aluminum triphosphate is preferred. A wide variety of such pigments are commercially available. One commercially available example is available under the trade designation SHEILDEX AC-5 from Grace Davison.

When heat resistance is desired, the optional anticorrosive agent(s) should be selected in a way so that significant quantities of catalytically active metals are excluded (or otherwise passivated) that would have a tendency to help cause degradation of the chlorinated resin. For example, some commercially available aluminum triphosphate often is blended with zinc oxide, while other aluminum triphosphate is generally substantially zinc free. The blended aluminum triphosphate could be acceptable for applications in which the resultant coating is not likely to see relatively high temperatures during service life. However, if the coating is likely to see high temperatures, aluminum triphosphate that is substantially free of catalytically active metals such as Zn may be desirably used.

The amount of anticorrosive agents used may vary over a wide range. If too little is used, the corrosion protection may be less than might be desired. Using too much may not provide meaningful additional protection as compared to using lesser amounts. Balancing such concerns, using from about 1 to about 20 parts by weight, more preferably 2 to 15 parts by weight of such agents per about 100 parts by weight of coating solids would be, suitable. In one illustrative embodiment, using about 5 parts by weight of zinc-free aluminum triphosphate per 100 parts by weight of coating solids would be suitable.

It is desirable to include a sufficient amount of one or more fillers, extenders or pigments (hereinafter "fillers") in the first aqueous coating composition to further improve corrosion protection, and/or provide optimal permeability through the coating once applied on the metal substrate. Additionally, the fillers may be used as thickeners, to help reduce foaming and to help improve sag resistance of the coating composition.

Without being bound to theory, it is believed that specific properties of the filler, including oil absorptivity, particle shape, particle size, aspect ratio, porosity, surface treatment, ion effects and the like, may contribute to the corrosion resistance of the coating. Surface active agents in the first coating composition and resin concentration may also impact selection of an appropriate filler or mixture of fillers.

Suitable fillers for use with the first aqueous coating composition include, insoluble compounds of one or more of Be, Mg, Ca, Sr, Ba, Al, Ti, transition metals, lanthanide metals, actinide metals, Si, Ge, Ga, Sn, Pb, combinations or mixtures of these, and the like. Insoluble compounds include sulfates, hydroxides, carbides, nitrides, oxides, oxynitrides, oxycarbides, silicates, and/or carbonates. Specific embodiments of such fillers include talc, $CaCO_3$, $BaSO_4$, aluminum silicate, aluminum hydroxide, mica, silica (as glass beads, for example), wollastonite, china clay, chlorite, dolomite, mixtures or combinations of the above, and the like. $BaSO_4$, $CaCO_3$, dolomite and wollastonite are preferred. In an aspect, the first aqueous coating composition includes a mixture of two or more fillers.

In an aspect, the fillers used with the first aqueous coating composition include non-platelet-shaped (e.g., nodular, acicular, spherical) particles, and platelet-shaped (e.g., platy, lamellar) particles. Exemplary pigments with platelet-shaped particles include, without limitation, mica, talc, chlorite, mixtures thereof, and the like. Exemplary pigments with non-platelet-shaped particles include, without limitation, insoluble sulfates, carbides, nitrides, oxynitrides, oxycarbides, oxides, and/or carbonates of Be, Mg, Ca, Sr, Ba, Al, Ti, transition metals, lanthanide series metals, actinide series metals, Si, Ge, Ga, Al, Sri, Pb, combinations thereof and the like.

In an embodiment, suitable fillers are selected based on oil absorptivity. In a preferred aspect, the first aqueous coating composition includes a suitable filler, or combination of two or more fillers, having oil absorptivity of no more than about 50 g of oil per 100 g total weight, preferably about 5 to 40 g/100 g, more preferably about 10 to 30 g/100 g, and most preferably about 15 to 20 g/100 g, as measured according to ASTM D281 (standard test method for oil absorption of pigment by spatula rub-out).

In an embodiment, suitable fillers are selected based on the aspect ratio of filler particles. Without being bound to theory, it is believed that a lower aspect ratio provides excellent corrosion protection and adhesion to the metal substrate. Without being bound by theory, the aspect ratio of a particular filler may contribute to the oil absorptivity of the filler, i.e. a filler with a lower aspect ratio may demonstrate lower oil absorptivity. Oil absorptivity may also be influenced by particle size and/or any parameter that affects the surface area of the filler particles.

In an aspect, fillers with non-platelet-shaped particles may be used in combination with fillers with platelet-shaped particles. The weight ratio of non-platelet-shaped to non-platelet shaped pigments can vary over a wide range, in illustrative embodiments, this ratio may be in the range from about 1:50 to 50:1, preferably about 1:10 to about 10:1; more preferably about 1:3 to about 3:1. For example, one embodiment of the first aqueous coating composition includes about 14.5 weight percent of relatively rounded $BaSO_4$ particles and about 14.5 percent by weight of platelet-shaped mica particles based on the total weight of the coating solids.

In an embodiment, the first aqueous composition includes a sufficient amount of filler particles, such that a coating prepared from the first coating composition includes from about 1 to 40 vol %, preferably 5 to 30 vol %, and more preferably about 10 to 25 vol %, based on the total volume of the dried coating, or pigment (i.e. filler) volume concentration (PVC). Without being bound to theory, it is believed that pigment volume concentration plays an important role in the corrosion resistance of the first aqueous coating composition. At optimal pigment volume concentration, the filler particles may alter the surface energy of the first aqueous coating composition in a manner that affects water vapor transmission, surfactant migration and corrosion resistance of a film of the first coating composition formed on a substrate.

A wide range of techniques may be used to prepare the first aqueous coating composition from the desired ingredients. According to an illustrative technique, the first resin component is reserved while the other ingredients are combined and mixed until homogeneous. Then, the reserved first resin is added to the admixture with further mixing until homogeneous.

According to another technique, the first aqueous coating composition can be made by first dispersing one or more CAS agents in an aqueous carrier under conditions effective so that the one or more CAS agents form an aqueous dispersion and do not agglomerate to an undue degree. Preferably, ammonia can be added in an amount sufficient to aid the dispersion of the CAS agents so that the agents can build a network and provide suitable sag resistance in a humid environment. After the aqueous dispersion is made, then the aqueous dispersion can be mixed with a resin component so as to form the aqueous coating composition.

In some embodiments, to help provide suitable sag resistance in a humid environment, modifications can be made to the spray booth and/or to the curing/drying oven in which the coating composition is applied to and cured on to substrate surface. In an aspect, the spray booth and/or oven system are modified to include an air removal and replacement system. An oven system for drying coatings applied to five-sided cargo containers is described in Applicants' co-pending U.S. application Ser. No. 12/837,833, entitled SYSTEM AND METHOD FOR DRYING FIVE-SIDED CONTAINERS, filed Jul. 16, 2010.

Referring to FIG. 1, before entering the drying chamber 30, a shipping container is sandblasted, a layer of a primer is applied on the interior and the exterior of all five sides of the sandblasted bare metal surface, and at least one overcoat layer is applied over the primer layer on all the primed surfaces. For example, a solvent-based basecoat and a solvent-based topcoat are typically applied on the primer coat before the container enters the chamber 30.

Referring again to FIG. 1, a painted shipping container 40 enters the chamber 30 and is transported through the chamber 30 on a wheeled carriage 32. As the container 40 moves through the chamber 30, the heated air from the openings 14, 16 moves rapidly upward through the chamber and flows over the inside surfaces 42 and the outside surfaces 44 of the container 40. The rapidly flowing heated air quickly evaporates the solvents in the paint on the surfaces 42, 44 as the air moves upward in the chamber 30 and enters suction openings 22, 24. In the suction openings 22, 24, the heated air is withdrawn from an upper region of the drying chamber 30, where the heated air is vented to the atmosphere or re-enters the air system 12.

Figure 2:
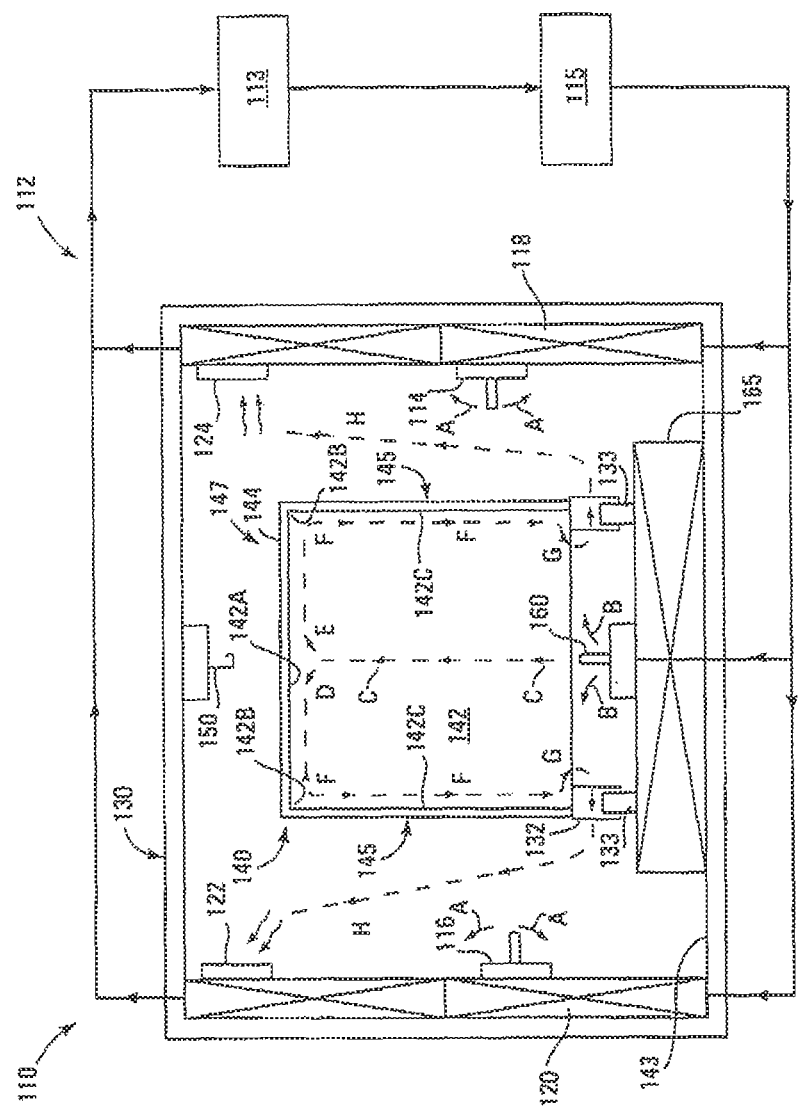
FIG. 2 is a schematic, cross-sectional view of an embodiment of a drying chamber used to dry a five-sided container coated with a water-based paint.

Referring to FIG. 2, a system 110 includes a drying chamber or oven 130. A source 112 of heated air with a blower 113 and a heater 115 supply a large volume of heated air to an arrangement of feed ducts 118, 120 in the oven 130. The drying chamber oven 130 may be partially or completely closed to the atmosphere, and a partially open configuration is shown in FIG. 2 for ease of description.

Referring again to FIG. 2, the painted container 140 enters the chamber 130 and is transported through the chamber 130 on a wheeled carriage 132. While the wheeled carriage is provides an example, the container 140 may be moved through the chamber 130 by any suitable method, including by placing the container 140 on an arrangement of moveable hooks 150. In the embodiment shown in FIG. 2, the container 140 is placed on the carriage 132 with the open side of the container 132 facing downward toward a floor 143 of the chamber 130. However, the presently claimed system and method are not limited to this arrangement—the open side of the container may be placed in any suitable orientation, depending on the configuration of the ductwork delivering the heated air into the open side of the container. In the embodiment of FIG. 2, the walls 145 of the container 140 are oriented downwardly in a first direction toward the floor 143 of the chamber 130. In this embodiment, a first side 147 of the container 140, which is opposite the open side of the container and substantially normal to the walls 145, is substantially parallel to the floor 143 of the chamber 130.

As the container 140 moves through the chamber 130, heated air is forcefully ejected from outlet openings 114, 116 to provide a flow of air to dry the outer surfaces 144 of the walls 145 and the bottom 147 of the container 140 as the container moves through the chamber 130. The outlet openings 114, 116 may optionally be moveable in the direction of the arrows A to provide more rapid and efficient drying.

In the system 110, heated air is supplied to a feed duct 165 and forcefully ejected from an arrangement of upwardly-facing discharge ducts 160 in the floor 143 of the chamber 130 to provide a flow of air to rapidly evaporate the water in the coatings on the interior surfaces of the container 140. The discharge ducts 160 may include, for example, upwardly-facing tubes or pipes, or slots in the floor 143 of the chamber 130. In the embodiment shown in FIG. 2, the tubes 160 may optionally be moveable (such as, for example, along the direction of the arrows B, and/or in a direction normal to the arrows B) to more efficiently direct the heated air into the interior 142 of the container 140. The discharge ducts 160 are arranged in the floor 143 of the chamber 130 such that the heated air moves rapidly upward into the open side of the container 140 in a second direction along arrows C and substantially opposite to the first orientation direction of the walls 145 of the container 140. The heated air then contacts an interior surface 142A of the first side 147 of the container 140, where it separates and moves along the interior surface 142A in substantially opposite third and fourth directions along arrows D, E to rapidly evaporate the water in the coating applied on the interior surface 142A. As can be seen from FIG. 2, the third and fourth directions D, E are substantially opposite one another and substantially normal to the first and the second directions.

When the heated air flow reaches a corner/edge region 1428 of the container 140 where at least one wall 145 and the bottom 147 thereof intersect, the air flow moves over the edge/corner region 142B, turns and moves in the first direction along the arrows F, and flows along the interior surfaces 142C of the walls 145 of the container 140. The rapidly moving air flow evaporates the water in the coating applied to the corner/edges 142B.

After traversing the interior surfaces 142C of the container 140, the air turns along the direction of arrows G and exits the interior 142 of the container 140 via the open side of the container 140. In the embodiment shown in FIG. 2, the air exits between the walls 145 of the container 140 and the carriage 132, or under and/or around the wheels 133 of the carriage 132. After exiting the container 140, the air moves upward in the chamber 130 along the direction of the arrows H and enters suction openings 122, 124. In the suction openings 122, 124, the heated air is withdrawn from an upper region of the drying chamber 130, where the heated air is vented to the atmosphere and/or re-enters the air supply system 112.

Figure 3:
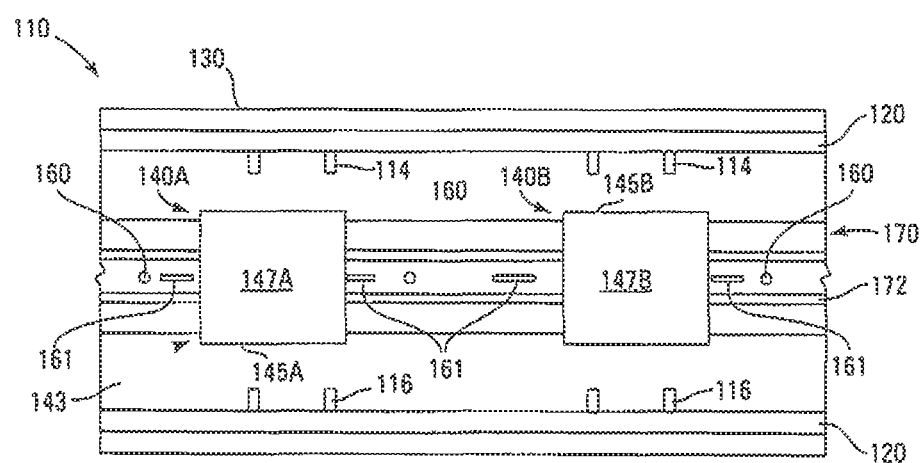
FIG. 3 is a schematic overhead view of the drying chamber of FIG. 2, showing multiple containers moving through the drying chamber.

Referring to FIG. 3, the system 110 may be sufficiently large to dry a plurality of five-sided shipping containers 140A, 140B at the same time. A conveyor system 170 may include tracks 172 to guide the wheeled carriages 132 (not shown in FIG. 3) through the chamber 130. The floor 143 of the chamber 130 includes an arrangement of air discharge ducts (tubes 160 and/or appropriately placed slots 161) to force heated air into the open side of the containers 140. The outlet openings 114, 116 supply heated air to dry the outside surfaces 145A, 145B and 147A, 147B of the containers 140A and 140B.

In an alternative embodiment shown in FIG. 4, which may be used alone or in combination with the system shown in FIGS. 2-3, a system 210 includes a drying chamber 230 to which heated air is supplied by an air source 212 including a blower 213 and a heater 215. The air source 212 supplied heated air to the outlet openings 214, 216, which are positioned to direct the heated air generally horizontally and between the moveable carriage 232 and the walls 245 of the five-sided shipping container 240, which in the embodiment of FIG. 4 is turned downwardly toward the floor of the chamber 230. The heated air is forcefully directed along the direction of the arrows A, where it enters the interior 242 of the container 240 via the open side thereof.

Upon entering the interior 242 of the container 240, the heated air streams flowing from the outlet openings 214 and 216 meet and merge to flow vertically upward along the direction of arrows B, which is substantially opposite to the first orientation direction of the walls 245 of the container 240. The heated air then contacts an interior surface 242A of the first side 247 of the container 240, where it separates and moves along the interior surface 242A in substantially opposite third and fourth directions along arrows C, D to rapidly evaporate the water in the coating applied on the interior surface 242A. As can be seen from FIG. 4, the third and fourth directions C, D are substantially opposite one another and substantially normal to the first and the second directions.

When the heated air flow reaches a corner/edge region 242B of the container 240 where at least one wall 245 and the first side 247 intersect, the air flow moves over the edge/corner region 242B, turns and moves in the first direction along the arrows E, and flows along the interior surfaces 242C of the walls 245 of the container 240. The rapidly moving air flow evaporates the water in the coating applied to the corner/edges 242B.

After traversing the interior surfaces 242C of the container 240, the aft turns along the direction of arrows F and exits the interior 242 of the container 240 via the open side of the container 240. In the embodiment shown in FIG. 4, the air exits between the walls 245 of the container 240 and the carriage 232, or under and/or around the wheels 233 of the carriage 232. After exiting the container 240, the air moves upward in the chamber 230 along the direction of the arrows C and enters suction openings 222, 224. In the suction openings 222, 224, the heated air is withdrawn from an upper region of the drying chamber 230, where the heated air is vented to the atmosphere and/or re-enters the air supply system 212.

The present disclosure further includes a method for drying a five-sided shipping container using the systems shown in FIGS. 2-4.

Once at least one layer of a water-based coating is applied to the five-sided shipping container, it may be placed in the drying chambers of FIGS. 2-4 to at least partially evaporate the water in the coating. The term dried as used herein refers to partially or fully evaporating the water in a coating such that the shipping container can be handled or undergo further preparation and/or painting steps. Since the water in water-based coatings is more difficult to evaporate than the VOCs in solvent-based coatings, processing the shipping container to dry the water-based coatings) thereon can be time-consuming and expensive. Using the systems of FIGS. 2-4, the drying time for a typical five-sided shipping container can be reduced to no more than about 20 minutes, preferably no more than about 10 minutes, and more preferably no more than about 8 minutes.

For example, to dry the coatings applied on the container 140 of FIG. 2, the parameters such as the size of the container 140, the thickness and the composition of the coatings applied to the container 140, and the temperature and humidity in the ambient air in the chamber 130, may vary widely. To ensure that the container 140 is dried within a reasonable amount of time after it enters the chamber 130, the blower 113 should circulate the heated air within the interior 142 of the container 140 such that the air flows smoothly and rapidly over the interior surfaces 142A, 142B and 142C. Preferably, the blower 113 should supply air at a velocity sufficient to provide smooth and substantially laminar flow over the interior surfaces of the container 140.

For example, in the present method, the systems of FIG. 2 may be used to provide a total drying time of less than about 20 minutes, preferably less than about 8 to less than about 10 minutes, after the container 140 enters the chamber 130. To make such a short drying time possible on such a large object, the blower 113 should provide a sufficient volume of air such that air is discharged in a substantially laminar flow from the arrangement of slots/tubes 160 at a velocity of about 1500 to about 3000 feet per minute (fpm), more preferably at about 2000 to about 2500 fpm. The volume of air discharged into the container should be about 500 to 100 cubic feet per minute (cfm), more preferably about 600 to about 800 cfm. The air volume discharged into the container is typically about 500-1000 cfm per linear foot of container, and a typical 40 foot shipping container would require about 20,000 to about 40,000 cfm.

The internal airflow within the container should be about 0.1 to about 10 meters/second, preferably about 0.3 to about 5 meters/second, and more preferably about 0.4 to about 3 meters/second. Within the container, the heated air has a temperature of about 50 to about 200° C., preferably about 75 to about 125° C.

Air replacement systems replace air exhausted from industrial and commercial buildings or spray booths, with fresh, heated outdoor air, (heated or otherwise) maintaining a constant leaving-air temperature regardless of the incoming air temperature, and outdoor-air temperature. Air replacement systems replenish equal amounts of fresh air for every cubic foot of air exhausted or removed from the spray booth or oven.

Typically, a spray booth's exhaust system will remove significant quantities of air during operation. A typical 10'×8'×6' (3.05 m×2.4 m×1.8 m) spray booth may exhaust more than 8,000 cubic feet (226.5 m$^3$) of air per minute, if replacement air is pulled directly from outside, this volume may be sufficient to cool the interior of the building and will adversely affect the quality of coatings. An air replacement system, including air replacement units provide conditioned and filtered air to the spray booth, and thereby minimize temperature variations. Any particulate matter that would adversely impact the finished quality of the coating is also preferably removed by such an air replacement system.

In the case of pressurized spray booths, air replacement is introduced directly into the spray booth, eliminating the need for air to be drawn from the outside. This allows for greater control over the temperature and filtration quality in the spray booth environment, thereby significantly improving the quality of the coating and eliminating problems associated with sag in a humid environment or an environment with variable temperatures.

In an aspect, an air replacement system is designed with a variable speed drive/motor and damper package to discharge either 140° F. (60° C.) or 160° F. (71° C.) air for an accelerated curing or drying cycle. This design reduces airflow 50% during the drying phase, and uses outside air to ensure constant replacement of humid air that forms in the oven as the waterborne coating system of the invention is dried.

The air replacement system described herein may also include an auto-balance system with a variable frequency drive to automatically adjust the airflow of the exhaust fan(s), to ensure proper booth balance, both during application in the spray booth and during the drying stage in the oven.

In addition, the air replacement unit may be designed with recirculating unit that includes a variable speed drive/motor and damper package to discharge either 140° F. (60° C.) 160° F. (71° C.) air for accelerated drying in the oven. The unit recirculates up to 80% of the air while exhausting 20% to atmosphere. Such a design provides energy efficiency by recirculating heated air, and thereby requiring less energy for the heating unit.

In some embodiments, to help provide sag resistance in a humid environment, the temperature and humidity of the air entering the spray booth and/or the drying oven may be varied. It is desirable to control the humidity by heating, cooling, humidifying or dehumidifying the air that enters the spray booth or the oven. The extent of heating, cooling, humidifying or dehumidifying necessary will depend on the temperature and humidity of the air as it enters the spray booth or oven.

In an aspect, where the air entering the spray booth is cooler and contains less moisture (i.e. has lower relative humidity) than needed, the incoming air is heated using by conventional means, e.g., either gas, electric or steam heating methods. Moisture is then introduced into the warm air through steam distributors or atomized/pressurized water that can be absorbed into the air.

In an aspect, where the air entering the booth is warmer and has high relative humidity, the incoming air is cooled to the dew point of the air needed, and heat is introduced by warming the air by conventional means, e.g., using gas, electric or steam heating methods. The air is then cooled by conventional means, e.g., by chilled water coil or evaporative cooling. This process removes moisture from the system and reduces air temperature in the spray booth and/or drying oven.

Other conventional methods for drying heated or humidified air in the spray booth and/or drying oven may be utilized. For example, a desiccant dehumidification system may be used, where a desiccant is mounted on a rotating wheel, and as the wheel turns, the desiccant passes alternately through incoming process air, when moisture is adsorbed, then through a regenerating zone when the desiccant is dried by means of a direct-fired gas burner or indirect-fired water/steam coil) and moisture is expelled. The process continues as the desiccant wheel turns. The desiccant system may include dry desiccant, liquid desiccant, or combinations thereof.

The composition of the present invention may be used to form primer coatings (or DTM coatings) having a wide range of dry film thicknesses. In illustrative embodiments, primer coatings have a dry film thickness in the range from about 20 micrometers to about 200 micrometers, preferably about 25 micrometers to about 150 micrometers, more preferably about 40 micrometers to about 130 micrometers, more preferably about 50 micrometers. In illustrative embodiments, DTM coatings have a dry film thickness in the range from about 25 micrometers to about 200 micrometers, preferably about 40 micrometers to about 150 micrometers, and more preferably about 60 micrometers to about 100 micrometers.

In addition to the first aqueous coating composition, coating systems of the present invention optionally further include additional ingredient(s) including at least a second aqueous coating composition. Significantly, the second aqueous coating composition provides water-based top coatings with enhanced compatibility for underlying base coatings incorporating chlorinated resins. The second resin component includes at least one resin that preferably includes acid functionality (or a salt and/or ester thereof) in combination with one or more pigments that cumulatively are present in significant amounts as described further below. Suitable resin(s) for use in the second aqueous composition may be acyclic, non-aromatic cyclic, branched, linear, aliphatic, or aromatic. Preferably, at least a portion of the pigment content includes platelet-shaped pigments. Desirably, the at least one resin used in the second aqueous coating composition is a film forming resin either on its own or in combination with another feature such as coalescing aid(s) and/or heat. When these second aqueous coating compositions are applied onto underlying coatings incorporating chlorinated resin(s), for instance, the top coats shows less blistering, less peeling, great durability and improved adhesion.

The second aqueous coating composition may be a single phase solution in which one or more ingredients including at least the second resin component are substantially fully dispersed in the aqueous carrier. Alternatively, the coating compositions may include two or more phases. Compositions including two or more phases may be in the form of dispersions such as a dispersion in which one or more phases are dispersed in a continuous phase of another material and/or phase. Many dispersions are in the form of suspensions including but not limited to colloidal suspensions. In some embodiments, coating compositions are in the form of a latex or emulsion including polymer microparticles dispersed in an aqueous carrier. Some compositions may be water-reducible.

The acid functionality (if any) of the resin(s) may be pendant directly from the polymer backbone or may be linked to the backbone by a suitable linking group. Examples of suitable acid functionality include carboxylic acid, sulfonic acid, phosphonic acid, combinations of these and the like. A wide variety of counter cations may be used in those embodiments in which the acid group is supplied as a salt. Examples of such cations include $Na^+$, $Li^+$, $NH_4^+$, $K^+$, combinations of these, and the like. In preferred embodiments, the acid functionality includes —C(O)O$NH_4$+. Advantageously, when coating compositions including these moieties dry, the dried coatings release ammonia, leaving —C(O)OH functionality in the dried coating.

In exemplary embodiments, a suitable copolymer is derived from reactants including (a) at least one aromatic reactant including pendant free radically polymerizable functionality; (b) at least one free radically polymerizable reactant having pendant acid functionality (or a salt or ester thereof); and (c) optionally at least one other copolymerizable reactant with free radically polymerizable functionality. Such reactants often are monomers, oligomers, and/or resins.

Examples of reactant (a) include styrene, alpha-methyl styrene, t-butyl styrene, 1,3-Diisopropenylbenzene, 2,4,6-Trimethylstyrene, 2,4-Dimethylstyrene, 2,4-Diphenyl-4-methyl-1-pentene, 2,5-Dimethylstyrene, 2-Vinylnaphthalene, 3-Methylstyrene, 4-Benzyloxy-3-methoxystyrene, 9-Vinyl anthracene, α,2-Dimethylstyrene, combinations of these, and the like. These may be substituted or non-substituted. Illustrative embodiments of the resin include from about 10 to about 70 parts by weight of reactant(s) (a) per about 100 parts by weight of the reactants used to form the resin.

Examples of reactant (b) include unsaturated or other free radically polymerized acids. In many embodiments, reactant (b) is provided by one or more carboxylic acids or anhydrides thereof having one or more acid groups. Examples include (meth)acrylic acid, sorbic acid maleic anhydride, maleic acid, crotonic acid, itaconic acid, cinnamic acid, palmitoleic acid, oleic acid, linoleic acid, arachidonic acid, benzoic acid, fumaric acid, combinations of these, and the like. Illustrative embodiments of the resin include from about 2 to about 20 parts by weight of reactant(s) (b) per about 100 parts by weight of the reactants used to form the resin. Preferably, the acid functionality is atypically high in that the one or more acid functional reactants incorporated into the resin are at least 3 weight percent, at least 4 weight percent, at least 5 weight percent, and up to 10, or 15, or 20 weight percent of total weight of all reactants used to make the resin.

Examples of reactant (c) include vinyl esters, vinyl ethers, lactams such as N-vinyl-2-pyrrolidone, (meth)acrylamide, N-substituted (meth)acrylamide, octyl (meth)acrylate, nonylphenol ethoxylate (meth)acrylate, isobornyl (meth)acrylate, 1,6-hexanediol (meth)acrylate, isobornyl (meth)acrylate, 2-(2-ethoxyethoxy)ethyl (meth)acrylate, 2-ethylhexyl (meth)acrylate, lauryl (meth)acrylate, beta-carboxyethyl (meth)acrylate, butyl (meth)acrylate; isobutyl (meth)acrylate, cycloaliphatic epoxide, alpha-epoxide, 2-hydroxyethyl (meth)acrylate, (meth)acrylonitrile, maleic anhydride, itaconic acid, isodecyl (meth)acrylate, dodecyl (meth)acrylate, n-butyl (meth)acrylate, methyl (meth)acrylate, hexyl (meth)acrylate, (meth)acrylic acid, N-vinylcaprolactam, stearyl (meth)acrylate, hydroxy functional caprolactone ester (meth)acrylate, octodecyl (meth)acrylate, isooctyl (meth)acrylate, hydroxyethyl (meth)acrylate, hydroxymethyl (meth)acrylate, hydroxypropyl (meth)acrylate, hydroxyisopropyl (meth)acrylate, hydroxybutyl (meth)acrylate, hydroxyisobutyl (meth)acrylate, tetrahydrofurfuryl (meth)acrylate, combinations of these, and the like. Illustrative embodiments of the resin include from about 10 to about 80 parts by weight of reactant(s) (c) per about 100 parts by weight of the reactant used to form the resin.

The resins useful in the second aqueous compositions may be polymerized from the constituent reactants using a variety of suitable polymerization techniques that are currently known or hereafter developed. These techniques are further described in U.S. patent application Ser. No. 11/560,329 (Publication 2007/0110981 A1, dated 17 May 2010.

In some embodiments, the second aqueous composition is in the form of a latex composition. The latex composition may comprise single stage and/or multistage latex polymers. Preferred single-stage latex polymers have a glass transition temperature (Tg) of at least −5° C., more preferably at least 15° C., and most preferably at least 25° C., and optimally at least 30° C. Preferred single-stage latex polymers for use have a Tg of less than 75° C., more preferably less than 65° C., and most preferably less than 55° C. Tg may be determined in the practice of the present invention using differential scanning calorimetry (DSC) techniques.

Preferred multistage latex polymers have between 10 and 50 wt. % hard segments and between 50 and 90 wt. % soft segments. The hard segment preferably has a Tg between 35 and 70° C., more preferably between 35 and 130° C. and the soft segment preferably has a Tg between 0 and 30° C.

It may also be advantageous to use a gradient Tg latex polymer made using continuously varying monomer feeds. The resulting polymer will typically have a DSC curve that exhibits no Tg inflection points, and could be said to have an essentially infinite number of Tg stages. For example, one may start with a high Tg monomer feed and then at a certain point in the polymerization start to feed a low Tg soft stage monomer composition into the high Tg hard stage monomer feed. The resulting multistage latex polymer will have a gradient Tg from high to low. In other embodiments, it may be favorable to feed a high Tg hard stage monomer composition into a low Tg soft stage monomer composition. A gradient Tg polymer may also be used in conjunction with multiple Tg polymers.

In addition to the free radically polymerizable resin(s) as described herein, the second resin component optionally may include one or more other kinds of resin components. Examples of other resins include polyurethanes, polyamides, polyimides, halogenated polymers, polysilicones, polyesters, alkyds, polyolefins, (meth)acrylic resins, combinations of these and the like.

The second aqueous coating composition preferably includes at least one resin in combination with one or more pigments that cumulatively are present in significant amounts as described further below. The one or more pigments generally are added to the second aqueous coating composition to help thicken the composition and/or to provide sag resistance, as well as improvements to application processes. These pigment(s) may be organic and/or inorganic. Inorganic pigments are more preferred. The pigments may have a variety of shapes such as being platelet-shaped, acicular, oblong, rounded, spherical, irregular, combinations of these and the like.

Without being bound by theory, optimal loading of pigments in topcoats formed from the second aqueous coating composition is believed to provide beneficial performance and application characteristics for the coating system. For example, the second aqueous coating composition desirably includes a sufficient amount of pigment content so that the resultant coating demonstrates enhanced compatibility with the underlying primer coating. Without being bound by theory, this enhanced compatibility may prevent the formation of blisters and the loss of adhesion between the primer layer and the topcoat layer. In addition, optimal pigment loading is believed to prevent entrapment of air, moisture or gases that would otherwise produce air bubbles during application to a substrate, or cause blistering and peeling of the coating from the substrate and/or primer. In many respects, the performance and application advantages are contrary to an industry bias that would expect performance to be reduced with increased pigment loading.

In many preferred embodiments, the second aqueous coating composition includes a sufficient amount of pigment, i.e. inorganic pigment particles, such that a resultant coating prepared from the second aqueous coating composition includes from about 15 to 85, preferably about 20 to 80, more preferably about 25 to 80 volume percent of the particles based on the total volume of the dry coating. These pigment particles are non-binder particles, and are distinct from film-forming particles (of binders, for example) that substantially coalesce and help to form part of the binder matrix in the resultant coating. Thus, the term "non-hinder" with respect to the pigment particles indicates that the pigment particles retain at least a portion and preferably substantially all of their particulate character, either individually or as agglomerates or aggregates. Preferred pigment particles are non-binder particles, and are substantially non-film forming under the conditions used to form the second aqueous coating composition. To the extent that any portions of such particles might protrude from the coating surface, those protruding portions are deemed to be part of the pigment volume for purposes of calculating the pigment volume concentration (PVC) of the particles in the coating. Optimal pigment loading in the topcoat composition provides beneficial performance and application characteristics for the coating system, reducing air entrapment during application and improving adhesion of the topcoat and primer.

It is preferred that at least a portion of pigment content of the second aqueous coating composition includes one or more platelet shaped pigment particles. Platelet particles have excellent thickening properties, provide excellent sag resistance, and also help with air release.

Examples of platelet-shaped pigments include one or more of a day such as china clay, mica, talc, combinations of these, and the like. China clay advantageously has less of an impact upon gloss than do many other platelet shaped particles, which is beneficial when higher gloss topcoatings are desired.

In many embodiments, the second aqueous coating composition preferably includes about 0 to 50 parts by weight, preferably about 10 parts by weight, more preferably about 15 to 50 parts by weight, and most preferably up to about 35 parts by weight of platelet-shaped particles per 100 parts by weight of the total weight of the second aqueous coating composition.

The size of platelet particles, expressed as a volume average, may vary over a wide range, ranging from finely sized particles to coarse particles. In illustrative, embodiments, platelet particles may have a size in the range from about 0.5 to 50 micrometers, preferably about 1 to 10 micrometers, more preferably about 3 to 5 micrometers. In an aspect, preferably at least about 50 wt %, more preferably about 75 wt % and most preferably about 95 wt % of the platelet-shaped particles have size in the range from about 0.5 to 50 micrometers, preferably about 1 to 10 micrometers.

It is desirable that the entire pigment content of the second aqueous coating composition is not all in the form of only platelet shaped particles. By themselves, the platelet particles may help thicken the composition and may help improve sag resistance and application of the coating composition. Yet too much platelet content could form a barrier to moisture and trapped gases in a dried coating. This could make it more difficult to release trapped air and/or trapped moisture from the coating during manufacture and/or coating. Accordingly, in some embodiments, the pigments of the second aqueous coating composition desirably include at least one kind of non-platelet shaped particle used in combination with at least one kind of platelet shaped particle.

A wide variety of non-platelet shaped particles could be used in combination with platelet shaped particles. Examples include one or more insoluble sulfates; one or more insoluble carbides; one or more insoluble nitrides; one or more insoluble oxynitrides; one or more insoluble oxycarbides; one or more insoluble oxides; one or more insoluble carbonates; combinations of these and the like. Examples of these include sulfates, carbides, nitrides, oxides, oxynitrides, oxycarbides, and/or carbonates of one or more of Be, Mg, Ca, Sr, Ba, Al, Ti, a transition metal, a lanthanoid series metal, an actinoid series metal, Si Ge, Ga, Al, Sn, Pb, combinations of these, and the like. Specific embodiments of such particles include $BaSO_4$, titania, SiC, SiN, TiC, TiN, combinations of these, and the like. $BaSO_4$ is preferred in many formulations. In some embodiments, some pigments help to maintain gloss, help thicken the second aqueous coating composition while allowing air to escape, and help provide resultant coatings with a desirable level of permeability so that moisture has good egress to and from the resultant coating.

The size of non-platelet particles, expressed as a volume average, may vary over a wide range, ranging from finely sized particles to coarse particles. In illustrative embodiments, non-platelet particles may have a size in the range from about 0.1 micrometers to 50 micrometers, preferably about 0.5 to 10 micrometers. In an aspect, preferably at least about 50 wt %, more preferably about 75 wt % and most preferably about 95 wt % of the platelet-shaped particles have size in the range from about 0.1 to 50 micrometers, preferably about 0.5 to 10 micrometers.

The weight ratio of platelet-shaped to non-platelet shaped pigments can vary over a wide range. For example, one embodiment of a second aqueous coating composition includes about 14.5 weight percent of relatively rounded $BaSO_4$ particles and about 14.5 percent by weight of platelet shaped china clay based on the total weight of the coating solids.

The pigments also serve other functions in the coating. By way of example, pigments may be used as thickeners, to help reduce foaming, and to help improve sag resistance. Additionally, pigments may be added to the coating to serve one or more of the functions described below with respect to optional additional ingredients.

In many embodiments, the second aqueous coating composition preferably includes at least 10 parts by weight, more preferably at least 15 parts by weight and up to 50 parts by weight, and most preferably up to about 35 parts by weight of platelet-shaped particles per about 100 parts by weight of the second resin component.

Additional particulate components of the second aqueous coating composition may be in the form of one or more additional ingredients described below.

The amount of second resin component in the second aqueous coating composition may be selected from a wide range. Generally, if the amount of resin component is too low, then it may be difficult to form a film, more difficult to form a film that has sufficient adhesion to the substrate, the filth may have insufficient corrosion resistance or other performance, and/or the like. If too much is used, then it may be harder to formulate a pigmented system or it may be more difficult to make a material that can be applied to the substrate. Balancing such concerns, the second aqueous coating composition preferably includes from about 10 to about 70 weight percent, more preferably about 15 to about 50 weight percent, and most preferably about 20 to about 40 weight percent of the first resin component based on the total weight of the aqueous coating composition.

The second resin component is in admixture with an aqueous fluid carrier, wherein "aqueous" is as defined above with respect to the aqueous carrier used in the first aqueous coating composition. In addition to water, the aqueous carrier of the second aqueous coating composition optionally may include one or more additional, optional co-carriers. Co-carrier(s) may be used for a variety of purposes, including helping in film formation and/or paint stability. Examples of co-carriers include butyl cellulose, alcohol(s), such as butanol, coalescents (e.g., conventional ester alcohol(s), such as the Eastman Texanol product and/or low VOC coalescents such as are described in U.S. Pat. No. 6,762,230), glycol ether(s), combinations of these, and the like. Desirably, so-called VOC-exempt co-solvent(s) are preferred.

The amount of co-carrier included in the second aqueous coating composition can vary over a wide range. The amount(s) to use will depend on factors including the type of co-carrier, the purpose for which the co-carrier is being added, the coating technique(s) that might be used to apply the first aqueous coating composition onto a substrate, and the like. In illustrative embodiments, the second aqueous coating composition may include from about 0.3 to about 20 weight percent, desirably about 1 to about 5 weight percent of co-carrier(s) based on the total weight of co-carrier and water included in the composition.

To further enhance heat resistance, one or more agents that help reflect heat and electromagnetic energy and/or that resist absorbing heat and electromagnetic energy may be incorporated into the second dispersion.

Examples of these include agents described in Assignee's co-pending application, WO2012003449, filed Jul. 1, 2011, which claims priority to U.S. App. Ser. No. 60/360,804, filed Jul. 1, 2010, These may be incorporated into the coating in accordance with conventional practices currently known or hereafter developed.

In some embodiments, such reflecting or absorbing agents include non-infrared-absorptive colored pigments. Exemplary such pigments may be inorganic or organic in nature, and include but are not limited to those referred to in U.S. Pat. No. 6,454,848 B2 (Sliwinski et al.), U.S. Pat. No. 6,616,744 B1 (Saint et al.), U.S. Pat. No. 6,989,056 B2 (Babler) and U.S. Pat. No. 7,157,112 B2 (Haines) and in U.S. Patent Application Publication No. US 2005/0126441 A1 (Skelborn). Inorganic pigments are especially desirable and include single or mixed metal oxides formed from a variety of metals, e.g., from aluminum, antimony, bismuth, boron, chromium, cobalt, gallium, indium, iron, lanthanum, lithium, magnesium, manganese, molybdenum, neodymium, nickel, niobium, silicon, tin, vanadium or zinc. It may be desirable to avoid using embodiments including Zn or the like if use of such ingredients in the resultant top coat may have a tendency to degrade or otherwise react with the chlorinated resin in the underlying primer layer. As an option, mixed metal combinations can be used, as described above, that provide a stabilizing effect. For example, mixed metal stabilization may occur in systems including combinations of barium/zinc, calcium/zinc, barium/calcium/zinc, and the like.

Exemplary metal oxides include $Cr_2O_3$, $Al_2O_3$, $V_2O_3$, $Ga_2O_3$, $Fe_2O_3$, $Mn_2O_3$, $Ti_2O_3$, $In_2O_3$, $TiBO_3$, $NiTiO_3$, $MgTiO_3$, $CoTiO_3$, $ZnTiO_3$, $FeTiO_3$, $MnTiO_3$, $NiCrO_3$, $FeBO_3$, $FeMoO_3$, $FeSn(BO_3)_2$, $BiFeO_3$, $AlBO_3$, $Mg_3Al_2Si_3O_{12}$, $NdAlO_3$, $LaAlO_3$, $MnSnO_3$, $LiNbO_3$, $LaCoO_3$, $MgSiO_3$, $ZnSiO_3$, $Mn(Sb,Fe)O_3$ and mixtures thereof. The metal oxide may have a rutile-kassiterite, spinel, and/or corundum-hematite crystal lattice structure as described in the above-mentioned U.S. Pat. No. 6,454,848 B2, or may be a host component having a corundum-hematite crystalline structure which contains as a guest component one or more elements selected from aluminum, antimony, bismuth, boron, chromium, cobalt, gallium, iridium, iron, lanthanum, lithium, magnesium, manganese, molybdenum, neodymium, nickel, niobium, silicon, tin, vanadium and zinc.

Black non-infrared-absorptive pigments are of particular interest due to the high infrared absorption of conventional carbon black pigments and the widespread use of carbon black pigments in conventional dark-tinted paints and stains. A variety of black non-infrared-absorptive pigments are commercially available, including mixed metal oxide pigments such as those supplied by Ferro Corporation under the COOL COLORS™ and ECLIPSE™ trademarks, for example V-778 COOL COLORS IR Black, V-780 COOL COLORS IR Black, V-799 COOL COLORS IR Black, 10201 ECLIPSE Black, 10202 ECLIPSE Black and 10203 ECLIPSE Black; mixed metal oxide pigments such as those supplied by Shepherd Color Company under the ARTIC™ trademark, for example ARTIC Black 376, ARTIC Black 10C909, ARTIC Black 411 and ARTIC Black 30C940; mixed metal oxide pigments such as those supplied by Tomatec America, Inc. under the numbers 42-707A and 707V10; and perylene-based or other organic colorants such as those supplied by BASF Corp. under the PALIOGEN™ trademark including PALIOGEN Black S 0084.

These same suppliers also provide non-infrared-absorptive colored pigments in a variety of hues other than black, typically under the same trademarks, and these may likewise be employed in the disclosed coating compositions. Exemplary non-infrared-absorptive non-black pigments include inorganic pigments such as iron oxide, magnesium silicates, calcium carbonate, aluminosilicates, silica and various clays; organic pigments including plastic pigments such as solid bead pigments (e.g., polystyrene or polyvinyl chloride beads); and microsphere pigments containing one or more voids (e.g., those discussed in U.S. Patent Application Publication No. US 2007/0043162 A1 (Bardman et al.).

Other exemplary non-infrared-absorptive pigments include EXPANCEL™ 551DE20 acrylonitrile/vinyl chloride expanded particles (from Expancel Inc.), SIL-CEL™ 43 glass micro cellular fillers (from Silbrico Corporation), FILLITE™ 100 ceramic spherical particles (from Trelleborg Fillite Inc.), SPHERICEL™ hollow glass spheres (from Potter Industries Inc.), 3M ceramic microspheres including grades G-200, G-400, G-600, G-800, W-210, W-410, and W-610 (from 3M) 3M hollow microspheres including 3M Performance Additives iM30K (also from 3M), INHANCE™ UH 1900 polyethylene particles (from Fluoro-Seal Inc.), and BIPHOR aluminum phosphate (from Bunge Fertilizantes S.A., Brazil).

The disclosed coating compositions may also contain non-infrared-absorptive non-colored pigments such as titanium dioxide and white zinc oxide, either of which if used without the presence of a colored pigment would provide a white rather than colored coating composition. The addition of such non-colored pigments to the above-mentioned non-infrared-absorptive colored pigments can provide tinted paints and stains having a lightened shade and improved hiding power. Preferably the disclosed coating compositions contain about 8 to about 50 wt. % and more preferably about 20 to about 30 wt. % pigment based on total solids. Expressed on the basis of pigment volume concentration, the disclosed coating compositions preferably contain about 10 to about 40 and more preferably about 15 to about 20 To pigment. The compositions desirably are free of or substantially free of infrared-absorptive colored pigments, e.g., carbon black, black iron oxide, brown oxide and raw umber.

A wide variety of other additional ingredients optionally may be included in the second aqueous coating composition if desired. Examples of these include one or more defoaming aids, grinding aids, wetting agents, surfactants, coalescing aids, processing aids, skid resistance agents, abrasion resistance agents, conductive agents, antistatic agents, coloring agents, anticorrosion aids, thickeners, sag resistant agents, plasticizers, antioxidants, ultraviolet stabilizers, biocides, fungicides, fillers, combinations of these, and the like. These can be used in accordance with conventional practices currently known or hereafter developed.

The second aqueous coating composition can be made using a variety of techniques. Exemplary techniques are described below in the examples.

The top coat composition of the present invention may be used to form top coatings having a wide range of thicknesses. In illustrative embodiments, top coatings have a thickness in the range from about 15 micrometers to 200 micrometers, preferably about 15 micrometers to 100 micrometers, more preferably about 30 micrometers to 50 micrometers.

The coating compositions and coating systems of the present invention can be used to coat a wide variety of substrates. Exemplary substrates include natural and engineered buildings, freight containers, flooring materials, walls, furniture, other building materials, motor vehicle components, aircraft components, trucks, rail cars and engines, marine components, machinery components, laminates, equipment components, appliances, packaging, and the like. Exemplary substrate materials include metals, metal alloys, intermetallic compositions, metal-containing composites, combinations of these, and the like. Exemplary metals include aluminum, steel, weathering steel, stainless steel, and the like. The coating compositions can be applied on new substrates or can be used to refurbish old substrates.

In use, a substrate to be coated is provided. The substrate may be bare or may be at least partially coated with a previous coating system, such as a so-called shop primer used to coat metal substrates. Illustrative shop primers include conventional shop primers and the novel primers disclosed in Applicant's U.S. Patent Appln. Ser. No. 61/322, 795 ("Waterborne Shop Primer", Prevost et al.), filed 9 Apr. 2010. It may be desirable to clean the substrate to remove grease, dirt, and other contaminants. Pre-existing coatings may or may not be removed as well, depending upon the context. When the substrate is ready, the first aqueous coating composition is applied to at least a portion of the substrate surface. Optionally, the coating is allowed to dry or partially dry to form a base coating. One or more additional coats of the first aqueous coating composition can be applied if desired. Often, a single coating is suitable. Next, the second aqueous coating composition is applied onto at least a portion of the base coating and allowed to dry to form a top coating. Additional portions of the substrate not bearing the base coating may be coated with the top coat as well, if desired. One or more additional coats of the second aqueous coating composition can be applied if desired. Often, a single coating is suitable. The first and second dispersion may be applied to the substrate using any suitable technique, such as by brushing, spraying, spin coating, roll coating, curtain coating, dipping, gravure coating, and/or the like.

In addition to being applied over primer coatings formed by the first aqueous composition, the top coat composition can be applied to form coatings on other kinds of coated and uncoated substrates as well. For example, some embodiments of the second aqueous coating composition may be used to top coat coated or uncoated stainless steel and/or epoxy primer coatings as described in Assignee's co-pending application WO2012054691, filed 20 Oct. 2011, which claims priority to U.S. App. Ser. No. 61/394,992, filed 20 Oct. 2010.

The coating system of the present invention is particularly suitable for forming protective coatings on cargo containers. Preferably, the coating system is used with cargo containers involved in intermodal freight transport. Many of such containers at least substantially conform to an international standard applicable to cargo containers that are transported by at least one of a marine cargo system that transports cargo across waterways, a system that transports cargo along a railway, and/or a system that transports cargo along a roadway. Such containers are often exposed to extreme environments in terms of weather exposure, salt water exposure, fresh water exposure, heat from the sun, and the like during their service lives. Even though such containers often may be made from corrosion resistant materials such as stainless steel and/or weathering steel, further protection against abrasion, corrosion, and the like is needed.

An exemplary intermodal cargo container is often referred to in the industry as a refrigerated cargo container. These containers generally include a metal frame defining the boundary of the container. Wall, floor, and ceiling panels are attached to the frame such as by bolts, welding, rivets, or the like. The panels can be made from a wide variety of metals, metal alloys, intermetallic compositions, or other metal-containing materials as described above. Due to its low cost and corrosion resistance, weathering steel (sometimes referred to as COR-TEN brand steel) often is used to make the panels. In a manner similar to aluminum, weathering steel oxidizes on the surface, but then this oxidation forms a barrier to protect the underlying steel from further corrosion. According to ASTM standards, weathering steel is available in grades including A242, A585, and A602. The container frames also may be made from weathering steel or a different metal composition. Even though weathering steel develops a protective oxidation barrier against corrosion, the industry still tends to widely apply protective coatings onto intermodal containers made from weathering steel. The coatings provide decoration, brand identity, bar codes, and other indicia.

The present invention shows excellent adhesion and performance when used to protect intermodal containers, including those made from weathering steel. A typical container will be supplied bearing a layer of oxide on at least a portion of the surfaces. In some instances, so called shop primer may also be applied to some surfaces, but not usually on the welds. The shop primer is a Zn-rich primer that helps to protect the steel from corrosion during container assembly.

The first aqueous coating composition of the present invention shows excellent adhesion to both shop primed and imprinted metal surfaces. Thus, the shop primer on the weathering steel need not be removed. However, for better adhesion, it is desirable to remove the oxide from the surface. This can be done in any suitable way such as by shot blasting. Once the surface is cleaned, a base coat of the present invention can be formed. After this, a top coat of the present invention is formed over the base coat. Even though both the base coat and top coat are water-based, the resultant coating system provides excellent gloss, durability, corrosion resistance, adhesion, resistance to blisters, resistance to peeling, and resistance to cracking.

EXAMPLES

The present invention will now be described with reference to the following illustrative examples.

Example 1A

The following ingredients are charged to a high speed mixing vessel. All listed amounts are parts by weight unless otherwise noted.

TABLE 1a

| Raw material | Vendor | Run 1 | Run 2 | Run 3 |
|---|---|---|---|---|
| AlPO3 | Various | 6.05 | | 6.05 |
| Ammonium Hydroxide | Ashland | 0.0026 | 0.0026 | 0.0026 |
| Bentone LT | Elementis | 0.086 | 0.086 | 0.086 |
| BYK 024 | BYK | 0.13 | 0.13 | 0.13 |
| BYK 155 | BYK | 0.52 | 0.52 | 0.52 |
| Dynol 604 | Air Products | 0.17 | 0.17 | 0.17 |
| Epi-rez 3510 | Hexion | | | 3.4 |
| EB solvent | Eastman Chemicals | 1.44 | 1.44 | 1.44 |
| Monolite carbon black | Heubauch | 0.85 | 0.85 | 0.85 |
| Pluronic F87 (30%) in Water | BASF | 5.1 | 5.1 | 5.1 |
| Shieldex | Grace | | 6.05 | |
| Sodium nitrite (10%) in water | Shiwu | 0.81 | 0.81 | 0.81 |
| Surfynol 104 | Air Products | 0.46 | 0.46 | 0.46 |
| Talc | Specialty Minerals | 20.37 | 20.37 | 20.37 |
| Texanol | Eastman Chemicals | 0.0937 | 0.0937 | 0.0937 |
| Water | | 15.41 | 10.6 | 10.6 |

The mixture is dispersed at high speed to a grind of 5-6 Hegman, then letdown with the following mixture of Table 1b. In some modes of practice, it may be desirable to pre-disperse the Bentone LT material in a portion of the water.

TABLE 1b

| Ammonium Hydroxide | pH control | 0.16 | 0.16 | 0.16 |
|---|---|---|---|---|
| Haloflex 202 | DSM Neoresins | 47.15 | 47.15 | 47.15 |

To the above is added the ingredients listed in Table 1c.

TABLE 1c

| Acrysol RM-8W | Rohm & Haas | 0.03 | 0.03 | 0.03 |
|---|---|---|---|---|
| Foamaster S | Cognis | 0.21 | 0.21 | 0.21 |

The primers of Runs 1 and 2 are formulated for situations that might experience high use temperatures. The primer of Run 1 is further formulated with a lower pH for improved flash rusting resistance. The primer of Run 3 has an epoxy component also to improve heat resistance.

Example 1B

The procedure of Example 1A, Run 3 is followed except that the Epi-rez 3510 epoxy resin is added with the ingredients of Table 1c instead of with the ingredients of Table 1a.

Example 2

Waterborne Topcoat Formulations

The following ingredients are charged to a high speed mixing vessel. All listed amounts are parts by weight unless otherwise noted.

TABLE 2a

| Raw material | Vendor | Run 1 | Run 2 |
|---|---|---|---|
| Aerosil 200 | Evonik | 0.4 | 0.4 |
| ASP 170 | BASF | 11.6 | 11.6 |
| Cimbar Ex | Cimbar | 11.6 | 11.6 |
| Disperbyk 190 | BYK | 1.2 | 1.2 |
| EB Solvent | Eastman Chemicals | 0.9 | 0.9 |
| Foamaster SA-3 | Cognis | 0.3 | 0.3 |
| Red Oxide | Chemik | 1.8 | |
| Tiona 595 | Cristal | 0.5 | 5 |
| Water | | 4.3 | 4.3 |
| Yellow Oxide | Chemik | 2.6 | |

The mixture is dispersed at high speed to a grind of 6.5 Hegman, then letdown with the following mixture of Table 2b.

TABLE 2b

| Acrysol RM-8W | Rohm & Haas | 1.4 | 1.4 |
|---|---|---|---|
| Ammonium Hydroxide | Ashland | 0.5 | 0.5 |
| EPS2568 | E.P.S. | 43.3 | 43.3 |
| Foamaster SA-3 | Cognis | 0.4 | 0.4 |
| Texanol | Eastman Chemicals | 2.2 | 2.2 |
| Water | | 17 | 16.9 |

The top coat of Run 1 has relatively high pigment to binder ratio and is a brown color. The top coat of Run 2 had relatively high pigment to binder ratio and is a white color.

Example 3

Water-Based Primer with Zn

The following ingredients are charged to a high speed mixing vessel. All listed amounts are parts by weight unless otherwise noted.

TABLE C1a

| Raw material | Vendor | Run 1 |
|---|---|---|
| Ammonium Hydroxide | Ashland | 0.0026 |
| Bentone LT | Elementis | 0.086 |
| BYK 024 | BYK | 0.13 |
| BYK 155 | BYK | 0.52 |
| Dynol 604 | Air Products | 0.17 |
| EB solvent | Eastman Chemicals | 1.44 |
| K-White 84S | Tayca | 6.05 |
| Monolite carbon black | Heubauch | 0.85 |
| Pluronic F87 30% in Water | BASF | 5.1 |
| Sodium nitrite 10% in water | Shiwu | 0.81 |
| Surfynol 104 | Air Products | 0.46 |
| Talc | Specialty Minerals | 20.37 |
| Texanol | Eastman Chemicals | 0.0937 |
| Water | | 15.41 |

The mixture is dispersed at high speed to a grind of 5-6 Hegman, then letdown with the following mixture of Table C1b. The Bentone LT may be predispersed in a portion of the water.

TABLE C1b

| Ammonium Hydroxide | Ashland | 0.16 |
|---|---|---|
| Haloflex 202 | DSM Neoresins | 47.15 |
| Then add: | | |
| Acrysol RM-8W | Rohm & Haas | 0.03 |
| Foamaster S | Cognis | 0.21 |

Example 4

Water-Based Topcoat

The following ingredients are charged to a high speed mixing vessel. All listed amounts are parts by weight unless otherwise noted.

TABLE 4a

| Raw material | | Run 1 |
|---|---|---|
| Aerosil 200 | Evonik | 0.4 |
| Disperbyk 190 | BYK | 1.1 |
| EB Solvent | Eastman Chemicals | 0.9 |
| Foamaster SA-3 | Cognis | 0.3 |
| Tiona 595 | Cristal | 11.9 |
| Water | | 3 |

The mixture is dispersed at high speed to a grind of 6.5 Hegman, then letdown with the following mixture of Table C2b.

TABLE 4b

| Acrysol RM-8W | Rohm & Haas | 1.4 |
|---|---|---|
| Ammonium Hydroxide | Ashland | 0.5 |
| EPS2568 | E.P.S. | 60.8 |
| Foamaster SA-3 | Cognis | 0.5 |
| Texanol | Eastman Chemicals | 2.2 |
| Water | | 17 |

Example 5

Performance Testier

Coatings prepared in the above examples are applied on standard dry container lines with minimal modification and can run at similar line speeds when used in conjunction with suitable curing ovens such as are as described in U.S. patent application Ser. No. 12/837,833 (System and Method for Drying Five-sided Containers (Nowack), filed 16 Jul. 2010. The above inventive examples pass HCL specification and industry standard performance testing. For better results the first aqueous composition is allowed to substantially dry before the second aqueous composition is applied.

Performance testing of primer/top coat systems are reported in the following tables.

| Combination | Salt Spray Testing ASTM B117 | Water Soak 60 hours @ 77 degrees F. w/tap water | Heat Testing 30 days at 180 F. constant temperature |
|---|---|---|---|
| Ex #1 Run 1/Ex#2 Run 1 | No. 10 | No. 10 | No. 10 |
| Ex #1 Run 1/Ex#2 Run 2 | No. 10 | No. 10 | No. 10 |
| Ex #1 Run 2/Ex#2 Run 1 | No. 10 | No. 10 | No. 10 |
| Ex #1 Run 2/Ex#2 Run 2 | No. 10 | No. 10 | No. 10 |
| Ex #1 Run 3/Ex#2 Run 1 | No. 10 | No. 10 | No. 10 |
| Ex #1 Run 3/Ex#2 Run 2 | No. 10 | No. 10 | No. 10 |
| Ex #3 Run 1/Ex#2 Run 1 | No. 10 | No. 10 | Medium No. 6 |
| Ex #1 Run 1/Ex#4 Run 1 | Medium No. 8 | Medium No. 8 | No. 10 |
| Ex #3 Run 1/Ex#4 Run 1 | Medium No. 8 | Medium No. 8 | Medium No. 6 |

Blister rating per ASTM D-714

| Description | Water vapor transmission rate (g/m2/day) | Temperature | Relative Humidity |
|---|---|---|---|
| Example #1 Run 1 | 5.3 | 38.7 C. | 90% |
| Example #2 Run 1 | 65.1 | 38.7 C. | 90% |

Test Equipment; Illinois instruments Model 7001

Test Method

The water-based primer compositions in Examples 5-8 were evaluated for sag resistance using the Dry Sag Resistance Test and Wet Sag Resistance Test.

Dry Sag Resistant Test—this test is performed in a typical "dry" environment in which a coating dries.
1. Prepare a sample by thoroughly stirring with a spatula in a container.
2. Strain if necessary to remove large particles or skins.
3. Adjust the temperature of the sample to 21° C.±2° C.
4. Affix a suitable test chart onto a drawdown plate. For example, use black and white Leneta charts in accordance with the color of the sample being tested.
5. Fasten a straight edge onto the drawdown plate in a suitable position.
6. Place an Anti-Sag bar (1-6 mil (25-152 micron) bar or 3-12 mil (635-305 micron) bar) at the far end of the chart, with the open side toward the operator.
7. If desired, position a catch-paper just underneath the lower edge of the chart.
8. Immediately after stirring, place about 8 mL of paint in front of the drawdown bar.
9. Draw down the coating at a uniform speed of about 6 inches per second (15.24 cm/second) with the applicator pressed against the straightedge to maintain a straight path.
10. Immediately hang the chart vertically with the drawdown stripes in a horizontal orientation like rungs in a standing ladder with the thinnest stripe at the top.
11. Allow the sag chart to dry in this position.
12. When the film is dry, note the notch clearances marked on the Anti-Sag Meter and identify the corresponding stripes accordingly.
13. Observe the sag pattern, ignoring the bottom stripe, which serves only as a position reference for the stripe above it.
14. Select the lowest (thickest) stripe that has resisted crossing the gap to touch the next lower stripe. This is referred to as the index stripe.
15. Estimate the degree to which the next lower stripe (post index stripe) has merged with the one below it.
15.1 Degree of Merger of Post-Index Stripe

| Addendum | Fraction |
|---|---|
| Complete | 0.0 |
| Almost Complete | 0.2 |
| Somewhat more than half | 0.4 |
| Half | 0.5 |
| Somewhat less than half | 0.6 |
| Slight (just touching) | 0.8 |

16. Multiply the fraction from step 15.1 by the clearance step between the index and Post-index stripes to obtain the "index addendum".

17. Report the sag resistance as the index stripe clearance plus the index addendum. This value is referred to as the Horizontal Anti-Sag Index of the coating.

18. Report the Anti-Sag Index in mils or micrometers (usually reported in mils). (Note: in the tables for Examples 5-8, this is reported as "sag room conditions"), Wet Sag Resistant Test—this test is performed in a representative "humid" environment in which a coating dries.

This test is performed in a manner similar to the "Dry Sag Resistant Test" with the modifications described below.

For step 6, a 3-12 (76-305 micron) mil or 12-60 mil (305-1524 micron) Leneta Anti-Sag Blade is used.

For step 10, immediately after making the drawdown, hang the drawdown in a 5 gallon (20 liter) pail having three inches (7.6 cm) of water in the bottom. Hang the drawdown with the stripes of paint in a horizontal position with lower mil thickness at the top. Place a cover over the bucket and allow the sample to dry for 20 minutes. It is estimated that the relative humidity of this test chamber is approximately greater than 80 percent.

For evaluating the sample, the strip of paint that sags sufficiently to cross into the next thicker strip of paint below should be considered the mil (micron) thickness where failure occurs. Also, record where the strip of paint forms dripping tears. This is a single area of failure on a strip of paint. In the tables for Examples 5-8, this is reported as "sag humid conditions"

Example 6

Water-Based Primer Compositions Having-Different Amounts of a Urethane Thickener The following ingredients were charged to a high speed mixing vessel. All listed amounts are parts by weight unless otherwise noted.

TABLE 6a

| Raw material | | Run 1 | Run 2 | Run 3 | Run 4 |
|---|---|---|---|---|---|
| Water | | 133.4 | 133.4 | 133.4 | 133.4 |
| BYK 024 | Defoamer | 1.4 | 1.4 | 1.4 | 1.4 |
| Disperbyk-190 | Surfactant | 20.1 | 20.1 | 20.1 | 20.1 |
| Raven 850 Black | Black Pigment from Columbian Chemicals | 24.6 | 24.6 | 24.6 | 24.6 |
| BYK 155 | Surfactant | 7.6 | 7.6 | 7.6 | 7.6 |
| 30% Pluronic F87 in Water | Surfactant | 37 | 37 | 37 | 37 |
| Surfynol 104 | Surfactant | 5 | 5 | 5 | 5 |
| Dynol 604 | Surfactant | 2.8 | 2.8 | 2.8 | 2.8 |
| AlPO3 | Anti-corrosive | 65.8 | 65.8 | 65.8 | 65.8 |
| Aerosil 200 | Fumed Silica | 12.9 | 12.9 | 12.9 | 12.9 |
| Talc | Filler | 227.3 | 227.3 | 227.3 | 227.3 |
| 10% Sodium nitrite in water | Flash Rust additive | 8.9 | 8.9 | 8.9 | 8.9 |
| EB solvent | Solvent | 23.6 | 23.6 | 23.6 | 23.6 |
| Texanol | Solvent | 1 | 1 | 1 | 1 |
| Water | | 33.9 | 33.9 | 33.9 | 33.9 |

The mixture was dispersed at high speed and run through a media mill to 5-6 NS according to a Hegman gauge, then letdown with the following mixture of Table 5b.

TABLE 6b

| Haloflex 202 | PVDC Resin | 512.9 | 512.9 | 512.9 | 512.9 |
|---|---|---|---|---|---|
| Ammonium Hydroxide | pH control | 1.8 | 1.8 | 1.8 | 1.8 |

To the above was added the ingredients listed in Table 5c.

TABLE 6c

| Foamaster S | Defoamer | 2.2 | | | |
|---|---|---|---|---|---|
| Rheolate 288 from Elementis | Thickener | 0 | 0.6 | 1.6 | 2.6 |

TABLE 6d

| Sag Room Conditions (wet mil) | 4 | 6 | 9 | 14 |
|---|---|---|---|---|
| Sag Humid Conditions (wet mil) | <4 | 4 | 4 | 6 |

Example 7

Water-Based Primer Compositions Having Different Amounts of a Fumed Silica Anti-Sag Agent The following ingredients were charged to a high speed mixing vessel. All listed amounts are parts by weight unless otherwise noted.

TABLE 7a

| Raw material | | Run 1 | Run 2 |
|---|---|---|---|
| Water | | 144 | 114.9 |
| Bentone LT | Thickener | 1 | 1 |
| HSD 5 minutes then add: | | | |
| Water | | 20 | 18.5 |
| Ammonium Hydroxide | pH control | 0.03 | 0.03 |
| BYK 024 | Defoamer | 1.5 | 1.4 |
| BYK 155 | Surfactant | 6.1 | 6 |
| 30% Pluronic F87 in Water | Surfactant | 40 | 40 |
| Surfynol 104 | Surfactant | 5.4 | 5.3 |
| Dynol 604 | Surfactant | 2 | 2 |
| AlPO3 | Anti-corrosive | 71 | 71 |
| Aerosil 200 | Fumed Silica | 0 | 5 |
| Talc | Filler | 239.2 | 239.2 |
| 10% Sodium nitrite in water | Flash Rust additive | 9.6 | 9.8 |

TABLE 7a-continued

| Raw material | | Run 1 | Run 2 |
|---|---|---|---|
| EB solvent | Solvent | 17 | 16.9 |
| Texanol | Solvent | 0 | 1 |
| Water | | 31.5 | 31.4 |
| Monolite carbon black | Black Tint paste | 10 | 10 |

Note:
"HSD" in Table 7a means "high speed disperser."

The mixture was dispersed at high speed and run through a media mill to 5-6 NS according to a Hegman gauge, then letdown with the following mixture of Table 6b.

TABLE 7b

| Haloflex 202 | PVDC Resin | 553.6 | 552.4 |
|---|---|---|---|
| Ammonium Hydroxide | pH control | 1.9 | 1.9 |

To the above was added the ingredients listed in Table 6c.

TABLE 7c

| Foamaster S | Defoamer | 2.4 | 2.4 |
|---|---|---|---|
| RM-8W | Thickener | 0.3 | 0.3 |

TABLE 7d

| Sag Room Conditions (wet mil) | 12 | 14 |
|---|---|---|
| Sag Humid Conditions (wet mil) | 4 | 4 |

Example 6 shows that fumed silica does not help sag resistance in a humid environment.

Example 8

Water-Based Primer Compositions Having Different Amounts of a CAS Agent

The following ingredients were charged to a high speed mixing vessel. All listed amounts are parts by weight unless otherwise noted.

TABLE 8a

| Raw material | | Run 1 | Run 2 | Run 3 | Run 4 |
|---|---|---|---|---|---|
| Water | | 118.5 | 118.5 | 118.5 | 118.5 |
| Bentone LT | CAS Agent | 1 | 2 | 2.8 | 3.4 |
| HSD 5 minutes then add: | | | | | |
| Ammonium Hydroxide | pH control | 0.03 | 0.03 | 0.03 | 0.03 |
| BYK 024 | Defoamer | 1.5 | 1.5 | 1.5 | 1.5 |
| BYK 155 | Surfactant | 5.8 | 5.8 | 5.8 | 5.8 |
| 30% Pluronic F87 in Water | Surfactant | 57.2 | 57.2 | 57.2 | 57.2 |
| Surfynol 104 | Surfactant | 5.1 | 5.1 | 5.1 | 5.1 |
| Dynol 604 | Surfactant | 1.9 | 1.9 | 1.9 | 1.9 |
| AlPO3 | Anti-corrosive | 67.8 | 67.8 | 67.8 | 67.8 |
| Aerosil 200 | Fumed Silica | 0 | 0 | 0 | 0 |
| Mistron Monomix | Extender pigment from Rio Tinto Minerals | 228.4 | 228.4 | 228.4 | 228.4 |
| 10% Sodium nitrite in water | Flash Rust additive | 9.1 | 9.1 | 9.1 | 9.1 |
| EB solvent | Solvent | 16.2 | 16.2 | 16.2 | 16.2 |
| Texanol | Solvent | 1 | 1 | 1 | 1 |
| Water | | 47.2 | 47.2 | 47.2 | 47.2 |
| Monolite carbon black | Black Tint paste | 9.5 | 9.5 | 9.5 | 9.5 |

The mixture was dispersed at high speed for runs 1 and 2 to 5-6 NS according to a Hegman gauge and run through a media mill to a 5-6 NS Hegman for runs 3 and 4, then letdown with the following mixture of Table 8b.

TABLE 8b

| Haloflex 202 | PVDC Resin | 528.8 | 528.8 | 528.8 | 528.8 |
|---|---|---|---|---|---|
| Ammonium Hydroxide | pH control | 1.8 | 1.8 | 1.8 | 1.8 |

To the above was added the ingredients listed in Table 8c.

TABLE 8c

| Epi-rez 3510 | Epoxy emulsion | 36.5 | 36.5 | 36.5 | 36.5 |
|---|---|---|---|---|---|
| Foamaster S | Defoamer | 2.3 | 2.3 | 2.3 | 2.3 |
| RM-8W | Thickener | 0.3 | 0 | 0 | 0 |

TABLE 8d

| | Run 1 | Run 2 | Run 3 | Run 4 |
|---|---|---|---|---|
| Sag Room Conditions (wet mil) | 12 | 12 | 15 | 17 |
| Sag Humid Conditions (wet mil) | 4 | 9 | 14 | 16 |
| Viscosity (Krebs) | 80 | 65 | 75 | 79 |

All samples added 5% water before testing sag

Example 8 shows that Bentone LT provides desirable sag resistance in a humid environment without requiring any additional sag resistant agents or thickeners.

Example 9

Water-Based Primer Compositions Having Different Amounts of a CAS Agent

The following ingredients were charged to a high speed mixing vessel. All listed amounts are parts by weight unless otherwise noted.

TABLE 8a

| Raw material | | Run 1 | Run 2 |
|---|---|---|---|
| Water | | 164.5 | 173.2 |
| Bentone LT | CAS Agent | 1.65 | 3.3 |
| HSD 5 minutes then add: | | | |
| Water | | 17.6 | 17.3 |
| Ammonium Hydroxide | pH control | 0 | 0 |
| BYK 024 | Defoamer | 1.3 | 1.3 |
| Disperbyk-190 | Surfactant | 19.2 | 18.9 |
| Raven 850 Black | Black Pigment from Columbian Chemicals | 23.4 | 23 |

TABLE 8a-continued

| Raw material | | Run 1 | Run 2 |
|---|---|---|---|
| BYK 155 | Surfactant | 7.7 | 9.5 |
| 30% Pluronic F87 in Water | Surfactant | 35.3 | 34.7 |
| Surfynol 104 | Surfactant | 4.7 | 4.6 |
| Dynol 604 | Surfactant | 2.2 | 2 |
| AlPO3 | Anti-corrosive | 62.3 | 61.6 |
| Talc | Filler | 265.6 | 261.2 |
| 10% Sodium nitrite in water | Flash Rust additive | 8.4 | 8.3 |
| EB solvent | Solvent | 22.4 | 22 |
| Texanol | Solvent | 1 | 1 |
| Water | | 34 | 22.7 |

The mixture was dispersed at high speed for runs 1 and 2 to 5-6 NS Hegman, then letdown with the following mixture of Table 9b.

TABLE 9b

| Haloflex 202 | PVDC Resin | 488 | 480 |
|---|---|---|---|
| Ammonium Hydroxide | pH control | 1.6 | 1.6 |

To the above was added the ingredients listed in Table 9c,

TABLE 9c

| Foamaster S | Defoamer | 2.6 | 2.6 |
|---|---|---|---|
| RM-8W | Thickener | 0 | 0 |

TABLE 9d

| Sag Room Conditions (wet mil) | 8 | 12 |
|---|---|---|
| Sag Humid Conditions (wet mil) | 4 | 10 |

Other embodiments of this invention will be apparent to those skilled in the art upon consideration of this specification or from practice of the invention disclosed heroin. Various omissions, modifications, and changes to the principles and embodiments described herein may be made by one skilled in the art without departing from the true scope and spirit of the invention which is indicated by the following claims.

What is claimed is:

1. A method of coating a metallic surface of an article, comprising the step of applying onto at least a portion of the substrate having a metallic surface under conditions effective to form a coating, a coating system comprising:
   a. an aqueous coating composition, comprising
      i. an aqueous carrier;
      ii. a resin component in admixture with the aqueous carrier; and
      iii. one or more CAS agents dispersed in the aqueous coating composition, wherein the one or more CAS agents are present in an amount greater than 0.12 kg per 100 L of the aqueous coating composition,
   wherein the aqueous coating composition has a pH of less than 6.

2. The method of claim 1, wherein the coating has a dry film thickness of about 25 to 130 µm.

3. The method of claim 1, wherein the conditions comprise allowing the coating to dry in an environment having a relative humidity in the range of up to 95%, with the coating drying in a time period of about 10 to 30 minutes.

4. The method of claim 1, wherein the metallic surface of the article comprises at least a portion of an intermodal cargo container.

5. The method of claim 1, wherein the one or more CAS agents are present in an amount sufficient to provide the aqueous coating composition with sag resistance at 80% relative humidity and 25° C. of at least 60% of the sag resistance of the aqueous coating at 50% relative humidity and 25° C.

6. The method of claim 1, wherein the one or more CAS agents comprise hydrophilic clay.

7. The method of claim 1, wherein the one or more CAS agents comprise organically modified clay.

8. The method of claim 1, wherein the one or more CAS agents comprise bentonite.

9. The method of claim 1, wherein the aqueous coating composition is substantially free of associative sag resistant agent(s).

10. The method of claim 1, wherein the aqueous coating composition includes less than 2 parts by weight associative sag resistant agent(s) per 10 parts by weight of the one or more CAS agents.

11. The method of claim 1, wherein the one or more CAS agents have average particle size of less than 1 µm.

12. The method of claim 1, wherein the aqueous coating composition has a Stormer viscosity of about 50 to 90 Krebs units at 25° C.

* * * * *